(12) United States Patent  
Suda

(10) Patent No.: US 10,646,095 B2  
(45) Date of Patent: May 12, 2020

(54) CLEANING TOOL

(71) Applicant: UNI-CHARM CORPORATION, Ehime (JP)

(72) Inventor: Tomokazu Suda, Kanonji (JP)

(73) Assignee: UNICHARM CORPORATION, Ehime (JP)

(*) Notice: Subject to any disclaimer, the term of this patent is extended or adjusted under 35 U.S.C. 154(b) by 1314 days.

(21) Appl. No.: 14/766,435

(22) PCT Filed: Jan. 17, 2014

(86) PCT No.: PCT/JP2014/050860  
§ 371 (c)(1),  
(2) Date: Aug. 6, 2015

(87) PCT Pub. No.: WO2014/122964  
PCT Pub. Date: Aug. 14, 2014

(65) Prior Publication Data  
US 2015/0359403 A1  Dec. 17, 2015

(30) Foreign Application Priority Data  
Feb. 7, 2013  (JP) .................................. 2013-022756

(51) Int. Cl.  
*A47L 13/38* (2006.01)  
*B32B 5/26* (2006.01)  
(Continued)

(52) U.S. Cl.  
CPC ............... *A47L 13/38* (2013.01); *A47L 13/12* (2013.01); *A47L 13/44* (2013.01); *B32B 3/266* (2013.01); *B32B 5/26* (2013.01); *B32B 2432/00* (2013.01)

(58) Field of Classification Search  
CPC .......... A47L 13/20; A47L 13/38; A47L 13/16; A47L 13/12; A47L 13/44; B32B 3/266; B32B 5/26  
(Continued)

(56) References Cited

U.S. PATENT DOCUMENTS 1,437,145 A  11/1922  Johnson  
3,616,157 A  10/1971  Smith et al.  
(Continued)

FOREIGN PATENT DOCUMENTS

CN  1775162 A  5/2006  
CN  101378690 A  3/2009  
(Continued)

OTHER PUBLICATIONS

Office Action in TW Application No. 103104108, dated Sep. 22, 2017. 12pp.  
(Continued)

*Primary Examiner* — Shay Karls  
(74) *Attorney, Agent, or Firm* — Hauptman Ham, LLP

(57) ABSTRACT

To provide a cleaning tool exhibiting excellent cleaning effectiveness. The present invention relates to a cleaning tool comprising a cleaning sheet, and a holding tool for holding said cleaning sheet. The cleaning sheet is provided with: a brush part capable of cleaning an object to be cleaned; a base part; and insertion parts for the holding tool. The brush part is configured from a fiber, and is provided with first brush regions and second brush regions. The second brush regions are provided with protruded regions configured so as to be longer than the first brush regions.

14 Claims, 26 Drawing Sheets

(51) Int. Cl.
   *B32B 3/26* (2006.01)
   *A47L 13/12* (2006.01)
   *A47L 13/44* (2006.01)

(58) Field of Classification Search
   USPC ... 15/229.3, 226, 229.4, 209.1, 229.7, 229.8
   See application file for complete search history.

(56) References Cited

U.S. PATENT DOCUMENTS

| | | |
|---|---|---|
| 7,987,547 B2 | 8/2011 | Popovsky et al. |
| 8,931,132 B2 | 1/2015 | Policicchio |
| 9,668,632 B2 | 6/2017 | Suda |
| 2001/0055926 A1 | 12/2001 | Fereshtehkhou et al. |
| 2002/0148061 A1 | 10/2002 | Tanaka et al. |
| 2004/0016074 A1 | 1/2004 | Tanaka |
| 2006/0101601 A1 | 5/2006 | Fujiwara et al. |
| 2006/0101602 A1 | 5/2006 | Lin et al. |
| 2006/0168751 A1 | 8/2006 | Lin et al. |
| 2007/0180640 A1 | 8/2007 | Knopow et al. |
| 2008/0040879 A1 | 2/2008 | Yang |
| 2009/0172904 A1 | 7/2009 | Tsuchiya et al. |
| 2009/0307860 A1 | 12/2009 | Tsuchiya et al. |
| 2010/0154156 A1 | 6/2010 | Takabayashi et al. |
| 2010/0319152 A1 | 12/2010 | Prizepasniak |
| 2011/0219559 A1 | 9/2011 | Tanaka et al. |
| 2012/0311803 A1 | 12/2012 | Yamada |
| 2013/0031738 A1* | 2/2013 | Fukuzawa ............... A47L 13/38 15/231 |
| 2014/0310903 A1 | 10/2014 | Yamada |
| 2017/0215685 A1 | 8/2017 | Teshima et al. |
| 2018/0042440 A1 | 2/2018 | Komatsu et al. |

FOREIGN PATENT DOCUMENTS

| | | |
|---|---|---|
| CN | 101511252 A | 8/2009 |
| EP | 1656875 A2 | 5/2006 |
| EP | 1832217 A1 | 9/2007 |
| EP | 1897480 A2 | 3/2008 |
| EP | 1967120 A2 | 9/2008 |
| EP | 2286705 A1 | 2/2011 |
| JP | 2002-369783 A | 12/2002 |
| JP | 2003-265389 A | 9/2003 |
| JP | 2007-135666 A | 6/2007 |
| JP | 2007-137566 A | 6/2007 |
| JP | 2008-6260 A | 1/2008 |
| JP | 2008-029800 A | 2/2008 |
| JP | 2011-104111 A | 6/2011 |
| JP | 2011-156295 A | 8/2011 |
| JP | 2012-147993 A | 8/2012 |
| TW | M433846 U1 | 7/2012 |
| WO | 99/37858 A1 | 7/1999 |

OTHER PUBLICATIONS

International Search Report dated Apr. 22, 2014 in International Application No. PCT/JP2014/050860.
Office Action in CN Application No. 201480007821.6, dated Jun. 2, 2016.
Written Opinion in International Patent Application No. PCT/JP20141050860, dated Apr. 22, 2014.
Supplementary European Search Report in EP Application No. 14748670.8 dated Aug. 11, 2016.
Office Action in JP Application No. 2013-022756, dated Nov. 25, 2016.
International Search Report in International Application No. PCT/JP2014/051585, dated Apr. 28, 2014, 4pp.
Office Action in CN Application No. 201480007807.6, dated May 25, 2016. 27pp.
Written Opinion in International Patent Application No. PCT/JP2014/051585, dated Apr. 28, 2014, 8pp.
Office Action in CN Application No. 201480007807.6, dated Feb. 20, 2017, 25pp.
Extended European Search Report in EP Application No. 14749280.5, dated Sep. 20, 2016, 8pp.
Office Action in TW Application No. 103104105, dated Jul. 25, 2017, 8pp.
Office Action in CN Application No. 201480007807.6, dated Aug. 11, 2017, 26pp.
International Search Report in International Application No. PCT/JP2014/051586, dated Apr. 28, 2014 , 4pp.
Office Action in CN Application No. 201480007766.0, dated May 24, 2016, 15pp.
Written Opinion in International Patent Application No. PCT/JP2014/051586, dated Apr. 28, 2014, 8pp.
Extended European Search Report in EP Application No. 14748667.4, dated Sep. 20, 2016, 13pp.
Office Action in TW Application No. 103104104, dated Jul. 11, 2017, 9pp.
Office Action in ID Application No. P00201505391, dated Jan. 9, 2019, 4pp.

* cited by examiner

CLEANING TOOL

RELATED APPLICATIONS

The present application is a National Phase of International Application Number PCT/JP2014/050860, filed Jan. 17, 2014, and claims priority of Japanese Patent Application No. 2013-022756 filed on Feb. 7, 2013.

TECHNICAL FIELD

The present invention relates to a cleaning tool for cleaning an object to be cleaned. Further, internal applications of PCT/JP2014/050859, PCT/JP2014/051585, PCT/JP2014/051586 and PCT/JP2014/051587 are respectively incorporated by reference.

BACKGROUND ART

Japanese Unexamined Patent Application Publication (JP-A) No. 2007-137566 discloses a cleaning article having a grip insertion part, and a fiber layer and a scraping sheet which are provided on each of the upper and lower sides of the grip insertion part. The grip insertion part is formed by a pair of grip attaching sheets. When used, the cleaning article is attached to a grip.

Ends of this cleaning article in its transverse direction has a zigzag shape.

PRIOR ART DOCUMENT

Patent Document

Patent Document 1: JP-A No. 2007-137566

SUMMARY OF THE INVENTION

Problem to be Solved by the Invention

The cleaning article disclosed in JP-A No. 2007-137566 has zigzag transverse ends, so that fibers of the fiber layer have various lengths in the transverse direction. Therefore, it may have a poor cleaning effect in a part of the fiber layer which has a short cleaning length.

Accordingly, it is an object of the present invention to provide a cleaning tool having an excellent cleaning effect.

Means for Solving the Problem

In order to solve the above problem, according to a preferred aspect of the present invention, a cleaning tool having a cleaning sheet and a holder for holding the cleaning sheet is provided. The cleaning sheet is configured to extend in a longitudinal direction which is defined by a direction of insertion of the holder into the cleaning sheet, and in a transverse direction which is defined by a direction crossing the longitudinal direction. The holder has a holding part for holding the cleaning sheet, and a grip part which is connected to the holding part and designed to be held by a user. The cleaning sheet has ends in the longitudinal direction, ends in the transverse direction, a brush part capable of cleaning an object to be cleaned, a base connected with the brush part, and an insertion part which is formed on the base and into which the holding part is inserted. The brush part is formed by a fiber assembly of fibers having the same length and having orientation in a prescribed direction and includes a first brush region and a second brush region. The second brush region is configured to be longer than the first brush region and has a protruding region.

In a further aspect of the cleaning tool according to the present invention, the cleaning tool has a longitudinal center line which is a line passing in the longitudinal direction through a center in the transverse direction, a first brush region length which is the longest distance in the transverse direction between an end of the first brush region in the transverse direction and the longitudinal center line, and a second brush region length which is the longest distance in the transverse direction between an end of the second brush region in the transverse direction and the longitudinal center line, and the second brush region length is longer than the first brush region length.

In a further aspect of the cleaning tool according to the present invention, the second brush region is formed in a direction crossing a direction of orientation of the fiber assembly, and has a brush region bonded part which bonds a prescribed region of the fiber assembly.

In a further aspect of the cleaning tool according to the present invention, the fibers of the fiber assembly which form the protruding region have orientation in the transverse direction.

In a further aspect of the cleaning tool according to the present invention, the first brush region is provided on the ends in the longitudinal direction.

In a further aspect of the cleaning tool according to the present invention, the second brush region is provided on the ends in the longitudinal direction.

In a further aspect of the cleaning tool according to the present invention, the first brush region is provided on the ends in the transverse direction.

In a further aspect of the cleaning tool according to the present invention, the second brush region is provided on the ends in the transverse direction.

In a further aspect of the cleaning tool according to the present invention, the first brush regions and the second brush regions are alternately arranged.

In a further aspect of the cleaning tool according to the present invention, the base is formed by a first sheet element.

In a further aspect of the cleaning tool according to the present invention, the cleaning tool has a second sheet element which is superposed on the first sheet element, and the insertion part is formed between the first sheet element and the second sheet element.

In a further aspect of the cleaning tool according to the present invention, the insertion part is formed by forming a bonding sheet region by contact of prescribed surfaces of the first sheet element with each other and bonding the prescribed surfaces in the bonding sheet region.

In a further aspect of the cleaning tool according to the present invention, the cleaning tool has a third sheet element which is superposed on the first sheet element, and a fourth sheet element which is superposed on the third sheet element, and the insertion part is formed between the third sheet element and the fourth sheet element.

In a further aspect of the cleaning tool according to the present invention, the cleaning tool has a fifth sheet element which is superposed on the first sheet element, and the insertion part is formed by forming a bonding sheet region by contact of prescribed surfaces of the fifth sheet element with each other and bonding the prescribed surfaces in the bonding sheet region.

In a further aspect of the cleaning tool according to the present invention, the brush part is provided on one side of the base.

In a further aspect of the cleaning tool according to the present invention, the brush part is provided on one side and the other side of the base.

Effect of the Invention

According to the present invention, a cleaning tool having an excellent cleaning effect can be provided.

BEST MODES FOR CARRYING OUT THE INVENTION (Outline of Cleaning Tool)

An embodiment of the present invention is now described with reference to FIGS. 1 to 10. A structure of a cleaning tool A as one embodiment of a "cleaning tool" according to the present invention is now explained. Objects to be cleaned by using the cleaning tool A typically include surfaces to be cleaned (floors, walls, windows, ceilings, external walls, furniture, clothes, curtains, bedding, lighting, home electric appliances, etc.) inside and outside of houses, apartments, buildings, factories, vehicles, etc. and surfaces of human body parts to be cleaned. The surfaces to be cleaned may be either flat or curved, uneven or stepped.

Figure 1:
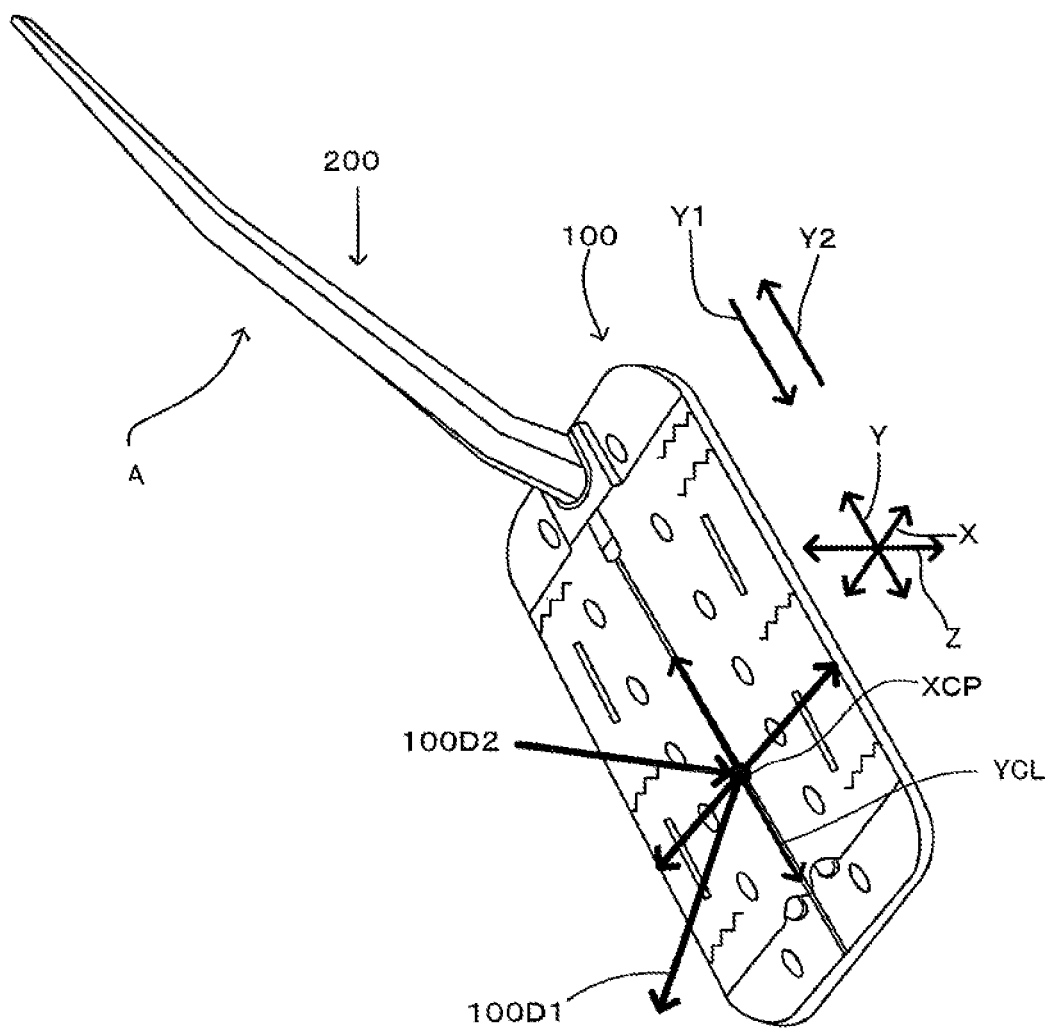
FIG. 1 is a perspective view showing an overall structure of a cleaning tool according to an embodiment of the present invention.

As shown in FIG. 1, the cleaning tool A includes a cleaning element holder 200 and a cleaning element 100. The cleaning element holder 200 is configured to be removably attached to the cleaning element 100 and to hold the cleaning element 100. The cleaning tool A, the cleaning element holder 200 and the cleaning element 100 are example embodiments that correspond to the "cleaning tool", the "holder" and the "cleaning sheet", respectively, according to this invention.

The cleaning element 100 is configured to extend in a longitudinal direction Y and a transverse direction X crossing the longitudinal direction Y. The longitudinal direction Y is defined by a direction parallel to a direction of insertion of the cleaning element holder 200 into the cleaning element 100. The direction of insertion of the cleaning element holder 200 into the cleaning element 100 is defined as an inserting direction Y1, and a direction opposite to the inserting direction Y1 is defined as a pulling-out direction Y2.

A direction crossing the longitudinal direction Y and the transverse direction X is defined as a thickness direction Z. The term "crossing" as used in this specification means "perpendicularly crossing" unless otherwise specified.

The longitudinal direction Y and the transverse direction X are example embodiments that correspond to the "longitudinal direction" and the "transverse direction", respectively, according to this invention.

A center point of the cleaning element 100 in the transverse direction X is defined as a transverse direction center point XCP. The transverse direction center point XCP can be formed on a line passing through any point on the cleaning element 100 in the transverse direction X.

A line passing through the transverse direction center point XCP in parallel to the longitudinal direction Y is defined as a longitudinal center line YCL.

The transverse direction center point XCP and the longitudinal center line YCL are example embodiments that correspond to the "center in the transverse direction" and the "longitudinal center line", respectively, according to this invention.

A direction away from the transverse direction center point XCP of the cleaning element 100 is defined as an outside direction 100D1, and a direction toward the transverse direction center point XCP of the cleaning element 100 is defined as an inside direction 100D2.

(Structure of the Cleaning Element Holder)

Figure 2:
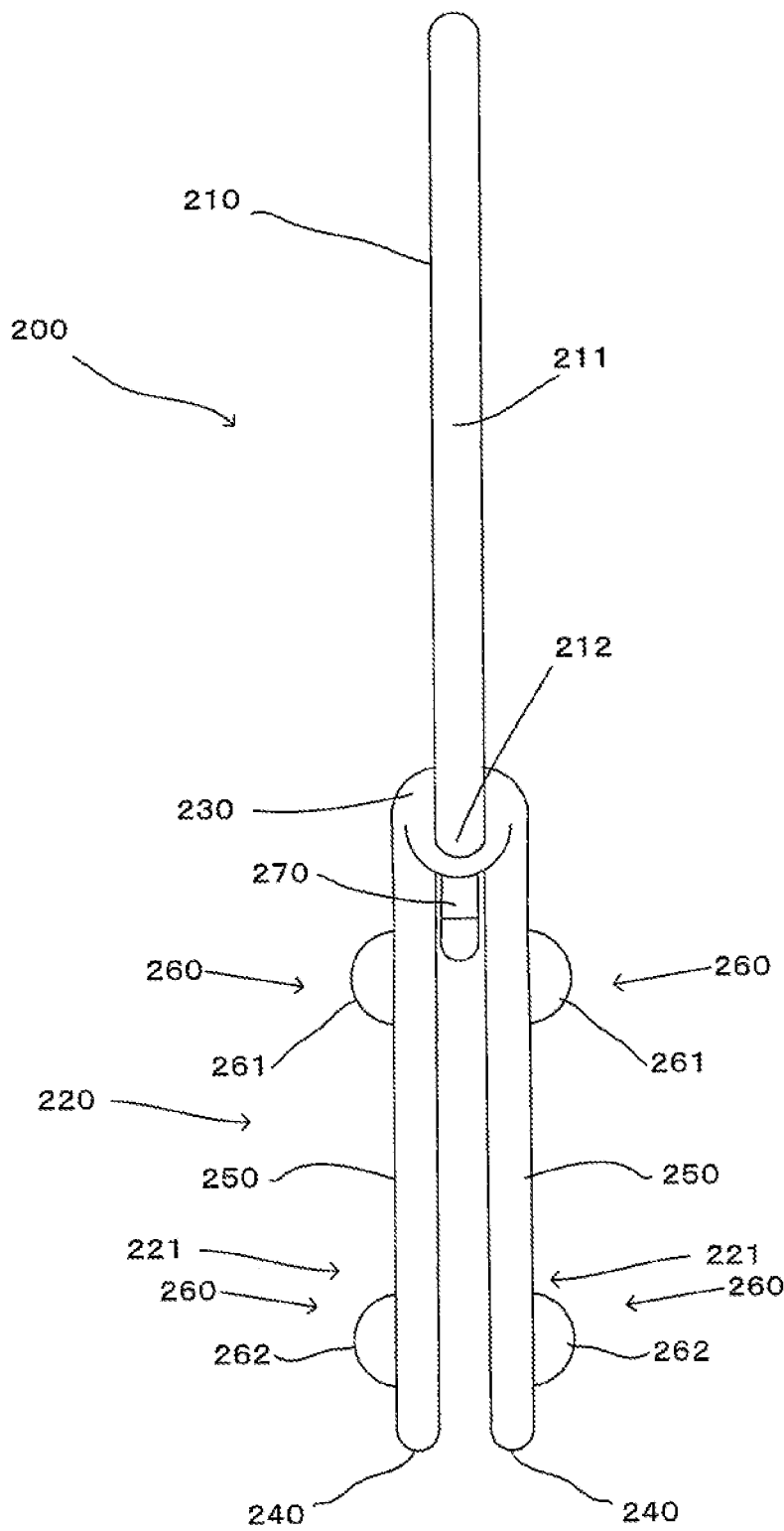
FIG. 2 is a plan view of a cleaning element holder.

As shown in FIG. 2, the cleaning element holder 200 mainly includes a handle part 210 and a cleaning element holding part 220. The handle part 210 is an elongate member to be held by a user during cleaning. The handle part 210 has a handle 211 and a handle connecting part 212. The handle connecting part 212 is connected to a connection part 230 of the cleaning element holding part 220. The handle 211 extends in an elongate form from the handle connecting part 212. The handle part 210 and the cleaning element holding part 220 are example embodiments that correspond to the "grip part" and the "holding part", respectively, according to this invention.

The cleaning element holding part 220 is a member formed of resin material and configured to hold the cleaning element 100. The cleaning element holding part 220 mainly includes a pair of elongate holding members 221, a projection 260 and a retaining plate 270. Specifically, polypropylene (PP) is used to form the cleaning element holding part 220. Flexible resin materials, such as polyethylene (PE), polyethylene terephthalate (PET), acrylonitrile butadiene styrene (ABS) and thermoplastic polyester elastomer, can be appropriately selected for the cleaning element holding part 220.

Each of the holding members 221 extends from the connection part 230 in a direction opposite to the direction in which the handle 211 extends. Specifically, the holding member 221 has the connection part 230, a tip part 240 and an intermediate part 250 extending from the connection part 230 to the tip part 240. The tip part 240 of the holding member 221 is a free end.

The projection 260 is formed in the outside direction 100D1 in the intermediate part 250. The projection 260 includes a first projection 261 formed on the connection part 230 side and a second projection 262 formed on the tip part 240 side.

The retaining plate 270 protrudes from the connection part 230 and extends parallel to the pair holding members 221 therebetween. The retaining plate 270 is convexly curved downward, and further has an engagement lug (not shown) on the underside.

(Structure of the Cleaning Element)

Figure 7:
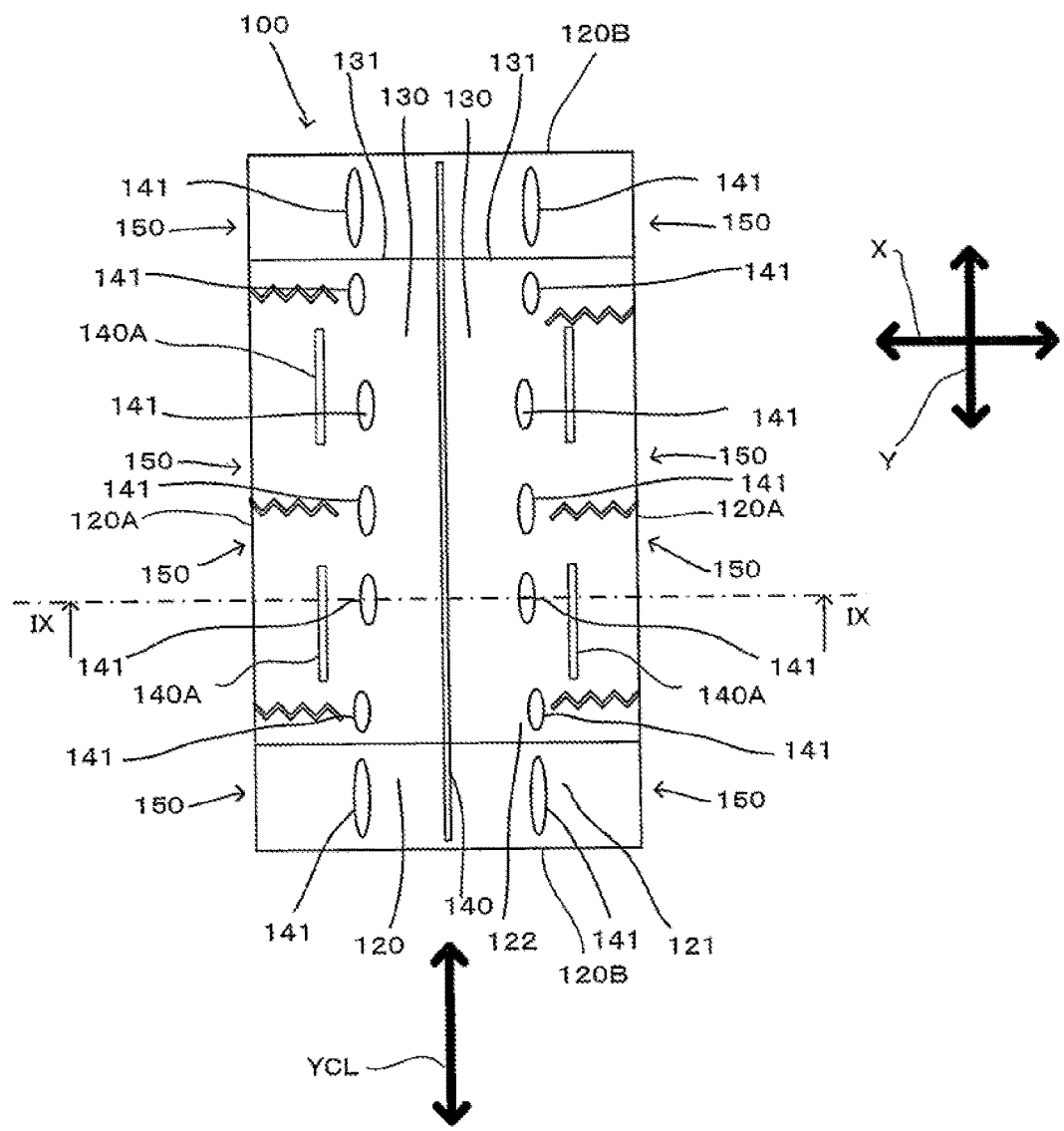
FIG. 7 is a plan view of the cleaning element as viewed from a second sheet element side.
Figure 8:
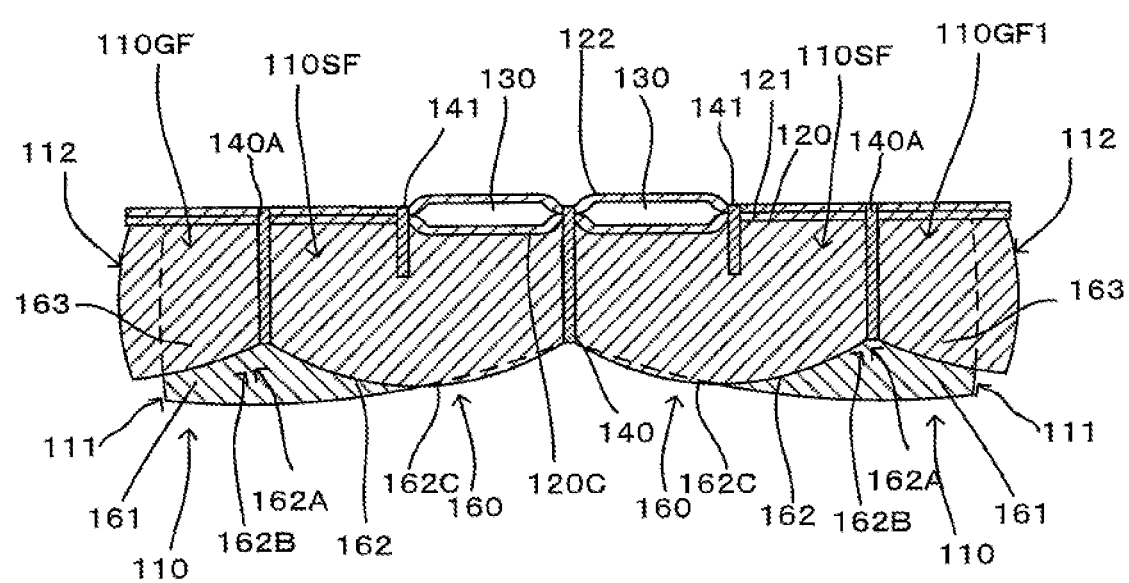
FIG. 8 is a sectional view taken along line IX-IX in FIG. 7.

The cleaning element 100 is now explained with reference to FIGS. 3 to 8. The cleaning element 100 has a sheet-like form and has a dirt collecting function of collecting dust or dirt on an object to be cleaned. As shown in FIGS. 4 and 7, the cleaning element 100 is rectangular in plan view.

The cleaning element 100 may be of disposable type designed for single use, disposable type designed for multiple use which can be used several times, while holding dust or dirt collected from the cleaning surface to be cleaned, or reusable type which can be reused by washing.

A base 120 of the cleaning element 100 is formed by a first sheet element 121. The base 120 has ends 120A in the transverse direction X and ends 120B in the longitudinal direction Y, and one side 120C and the other side 120D. The base 120, the first sheet element 121, the one side 120C and the other side 120D are example embodiments that correspond to the "base", the "first sheet element", the "one side" and "the other side", respectively, according to this invention.

A fiber assembly 110GF is disposed on the one side 120C of the base 120. A second sheet element 122 is disposed on the other side 120D of the base 120.

The base 120, the fiber assembly 110GF and the second sheet element 122 which are thus superposed one on the other extend in an elongate form in the longitudinal direction Y of the cleaning element 100.

The fiber assembly 110GF forms a brush part 110 having a dirt collecting function. The fiber assembly 110GF and the brush part 110 are example embodiments that correspond to the "fiber assembly" and the "brush part", respectively, according to this invention. The fiber assembly 110GF which is disposed on the one side 120C of the base 120 like in the cleaning element 100 of this embodiment is defined as a first fiber assembly 110GF1.

The fiber assembly 110GF is formed by an assembly of fibers 110SF. In this invention, the fiber 110SF is a single fiber structure formed by typical fibers, a fiber structure having typical fibers aligned in the length direction and/or the radial direction (twist yarn, spun yarn, yarn to which a plurality of filaments are partially connected), or an assembly of the fiber structures. The "typical fibers" as used herein are components of yarn, textile or the like and are thin and flexible fibers having a substantially longer length compared with the thickness. Typically, a long continuous fiber is defined as a filament and a short fiber as a staple.

The fibers 110SF contain thermoplastic fibers in part and can be fusion bonded (or welded).

The fiber assembly 110GF is formed of fibers 110SF which are arranged side by side along a prescribed direction of fiber orientation 110D and stacked in the thickness direction Z. In this embodiment, the direction of fiber orientation 110D substantially coincides with the transverse direction X. The fibers 110SF are flexible and thus easily bent and deformed. Therefore, the direction of fiber orientation 110D of the fibers 110SF refers to the fiber orientation in design of the product.

The fibers 110SF of the fiber assembly 110GF have a connection end 110SFA which is welded to a central bonded part 140. Further, the fibers 110SF have an open end 110SFB on the opposite side to the connection end 110SFA. The open end 110SFB is a free end.

Figure 3:
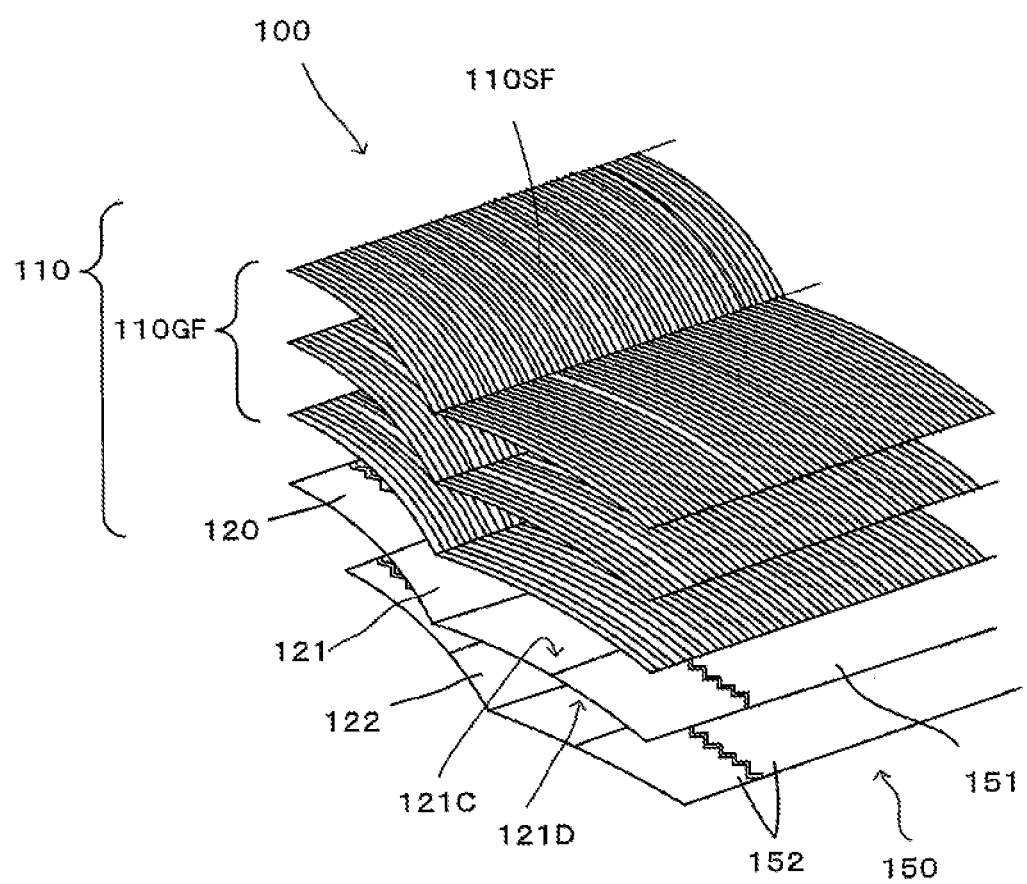
FIG. 3 is a perspective view of a cleaning element, in a state separated into elements.
Figure 4:
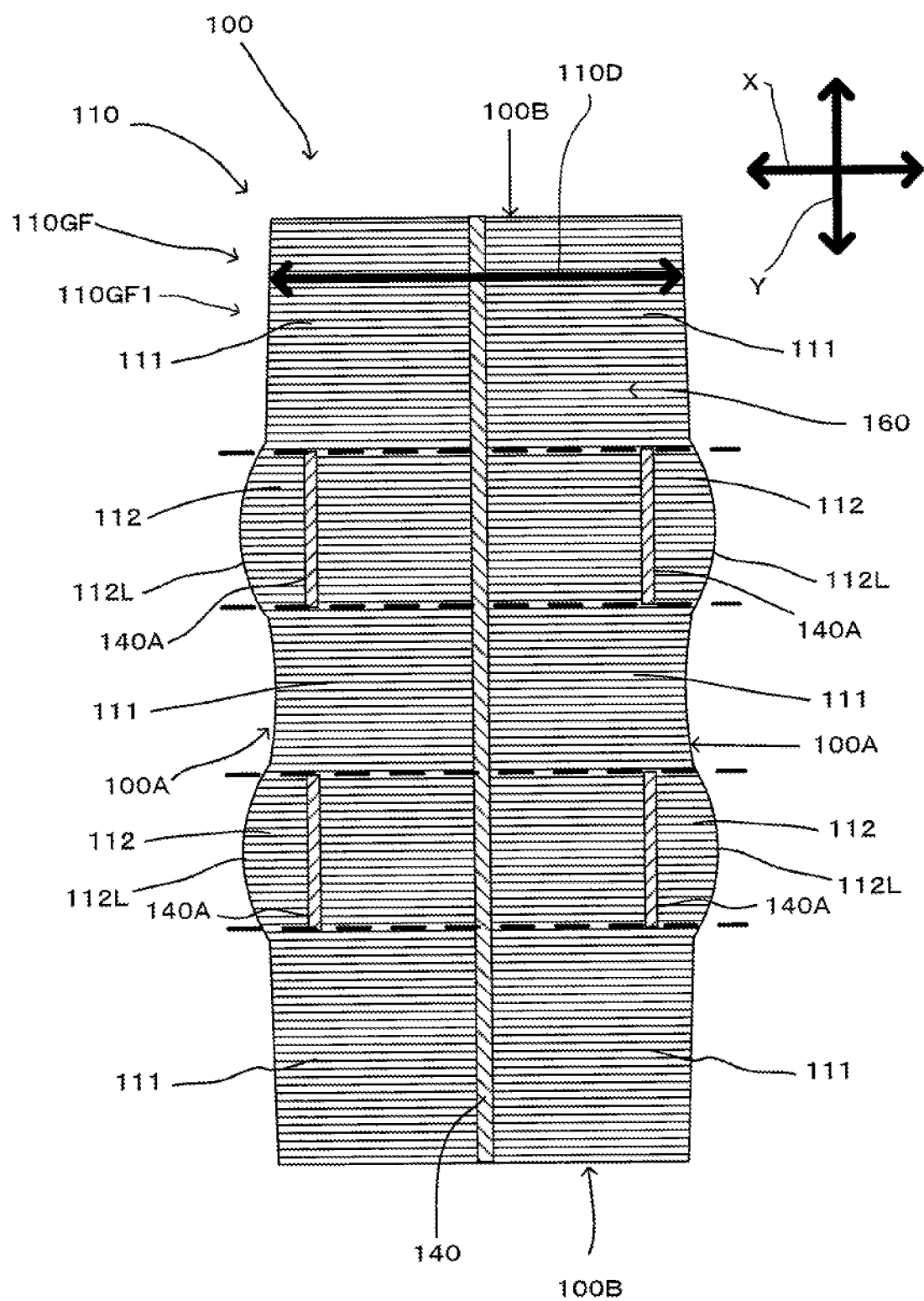
FIG. 4 is a plan view of the cleaning element as viewed from a brush part side.

In FIG. 3, the fiber assembly 110GF is formed by three fiber layers, but the number of fiber layers may be one or more other than three as necessary. Preferably, the fiber assembly 110GF has a planar structure having a predetermined flat or curved surface and has a three-dimensional form having a certain thickness or has a thin sheet-like form. The fiber assembly 110GF is typically formed of polyethylene (PE), polypropylene (PP), polyethylene terephthalate (PET), nylon, rayon or the like. In practical use, an assembly of filaments formed by opening a tow is preferably used as the fiber assembly 110GF. It is particularly preferable that the fiber assembly 110GF comprises conjugated fibers having a core of polypropylene (PP) or polyethylene terephthalate (PET) and a core covering sheath of polyethylene (PE). Further, the fibers 110SF of the fiber assembly 110GF preferably have a fineness of 1 to 50 dtex, or more preferably 2 to 10 dtex. Each fiber assembly may contain fibers of substantially the same fineness, or it may contain fibers of different finenesses.

Further, in order to enhance the dirt collecting function in cleaning, oil is applied to the fiber assembly 110GF. The oil is mainly composed of liquid paraffin.

Further, in order to enhance the sweeping-out function in cleaning, it is preferred to use the fiber assembly 110GF including the fibers 110SF having higher rigidity or the fibers 110SF having higher fineness. It is further preferred that the fiber assembly 110GF has crimped fibers. Here, the crimped fibers are fibers subjected to a prescribed crimping process and easily intertwined with each other. By using such crimped fibers, the fiber assembly 110GF becomes bulkier than before the cleaning element holder 200 is attached to the cleaning element, and dust can be easily captured by the crimped portions. This structure can be realized especially by using crimped fibers opened from tows.

The fibers 110SF of the fiber assembly 110GF forming the brush part 110 have the same length in the transverse direction X. Regarding the "same length", the crimped state of the fibers are not necessarily the same when the crimped fibers are used as the fibers 110SF as described above. Therefore, the fibers 110SF may not have completely the same length. Thus, the "same length" in the present invention only refers to the "same length in design".

Here, the "same length in design" is explained. In order to form the cleaning element 100, in a manufacturing process which is described below, a laminated material which is continuous in a machine direction M is cut in prescribed two regions in a direction crossing the machine direction M. At this time, when the material is cut in the prescribed two regions in a straight line and in parallel, the fibers have the "same length in design".

The "straight line" here does not necessarily refer to a "completely straight line", but it is sufficient to be a substantially "straight line", for example, even if it is curved for certain reasons on design.

As shown in FIG. 7, the second sheet element 122 is a rectangular nonwoven fabric sheet which is shorter than the base 120 in the longitudinal direction Y.

The base 120 (the first sheet element 121) and the second sheet element 122 are typically formed of sheet-like nonwoven fabric comprising thermal melting fibers (thermoplastic fibers). Therefore, the base 120 and the second sheet element 122 are also referred to as "nonwoven fabric sheet". In order to enhance the sweeping-out function in cleaning, it is preferred to use the nonwoven fabric having higher rigidity.

The nonwoven fabric is formed of synthetic fibers such as polyethylene (PE), polypropylene (PP) and polyethylene terephthalate (PET). Further, the nonwoven fabric is manufactured by through-air bonding or spun bonding.

Not only the nonwoven fabric, however, cloth or synthetic resin film may also be used.

The base 120 and the second sheet element 122 are welded at the central bonded part 140 extending along the longitudinal center line YCL of the cleaning element 100, and at a plurality of first bonded parts 141 arranged on the both sides of the central bonded part 140. Specifically, as shown in FIG. 7, the base 120, the second sheet element 122 and the fiber assembly 110GF are welded at the central bonded part 140. Further, the base 120, the second sheet element 122 and part of the fiber assembly 110GF are welded at the first bonded parts 141. The first bonded parts 141 located on the both end regions in the longitudinal direction Y are formed in positions where the second sheet element 122 does not exist. Therefore, the first bonded parts 141 located on the both end regions in the longitudinal direction Y only bond the base 120 and part of the fiber assembly 110GF.

A pair of holding spaces 130 are formed between the base 120 and the second sheet element 122 in a region between the central bonded part 140 and the first bonded parts 141 and extend in the longitudinal direction Y. Each of the holding spaces 130 has openings 131 on the both ends in the longitudinal direction Y. The holding space 130 is an example embodiment that corresponds to the "insertion part" according to this invention.

In other words, the holding spaces 130 are defined by a prescribed region of the base 120 and a prescribed region of the second sheet element 122 which extend between the pair first bonded parts 141 in the transverse direction X.

The first bonded parts 141 are continuously formed substantially along the longitudinal direction Y. It is not necessary for adjacent ones of the first bonded parts 141 in the longitudinal direction Y to be aligned in the longitudinal direction Y. The arrangement pattern of the first bonded parts 141 can be appropriately designed according to the design and the shape of the cleaning element holding part 220. Naturally, the first bonded part 141 may also be formed in a continuous linear shape.

Further, lateral bonded parts 140A are formed in prescribed regions between the ends 120A of the bases 120 in the transverse direction X and the central bonded part 140. In the transverse direction X, the lateral bonded parts 140A are formed between the ends 120A of the bases 120 in the transverse direction X and the first bonded parts 141. Further, in the longitudinal direction Y, the lateral bonded parts 140A are arranged at two positions spaced apart from each other in a direction parallel to the longitudinal direction Y. The lateral bonded parts 140A are also formed in pairs in the transverse direction X.

The lateral bonded parts 140A bond the base 120, the second sheet element 122 and the fiber assembly 110GF.

Further, it is not necessary to form the lateral bonded parts 140A at two positions in the longitudinal direction Y, and one or three or more lateral bonded parts 140A may be formed. Further, it is not necessary for the lateral bonded parts 140A to extend in parallel to the longitudinal direction Y.

The lateral bonded part 140A is an example embodiment that corresponds to the "brush region bonded part" according to this invention.

The central bonded part 140, the first bonded parts 141 and the lateral bonded parts 140A are formed by heat welding.

The bonded parts according to this invention may also be formed by ultrasonic welding, sewing or adhesives such as a hot-melt adhesive.

The brush part 110 has a first brush region 111 and the second brush region 112. The second brush region 112 has a protruding region 112L and is longer than the first brush region 111. The first brush region 111, the second brush region 112 and the protruding region 112L are example embodiments that correspond to the "first brush region", the "second brush region" and the "protruding region", respectively, according to this invention.

The first brush region 111 is formed of fibers 110SF which are not bonded by the lateral bonded parts 140A in the transverse direction X.

The second brush region 112 is formed of fibers 110SF which are bonded by the lateral bonded parts 140A in the transverse direction X.

Figure 5:
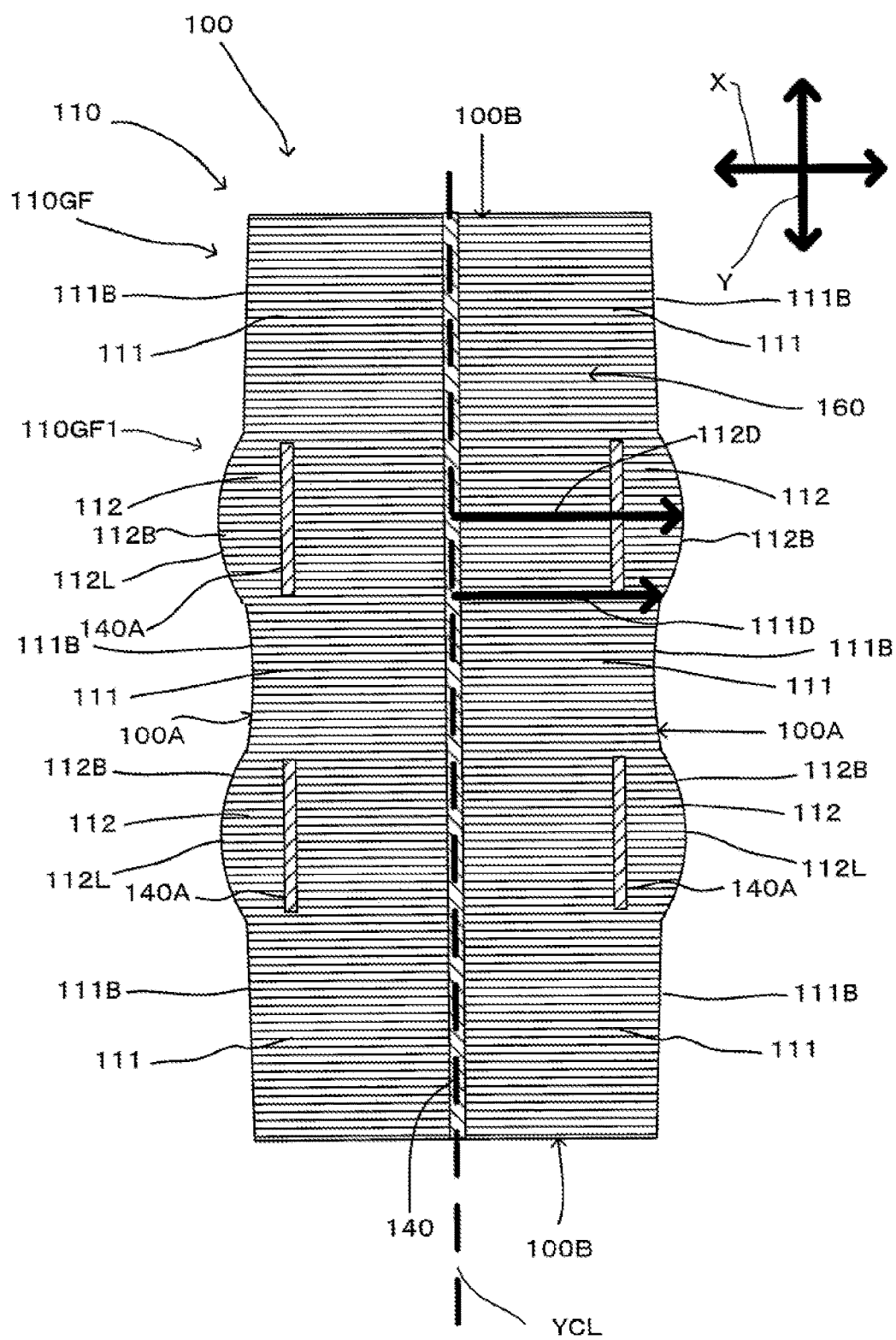
FIG. 5 is an explanatory drawing of the cleaning element as viewed from the brush part side.
Figure 6:
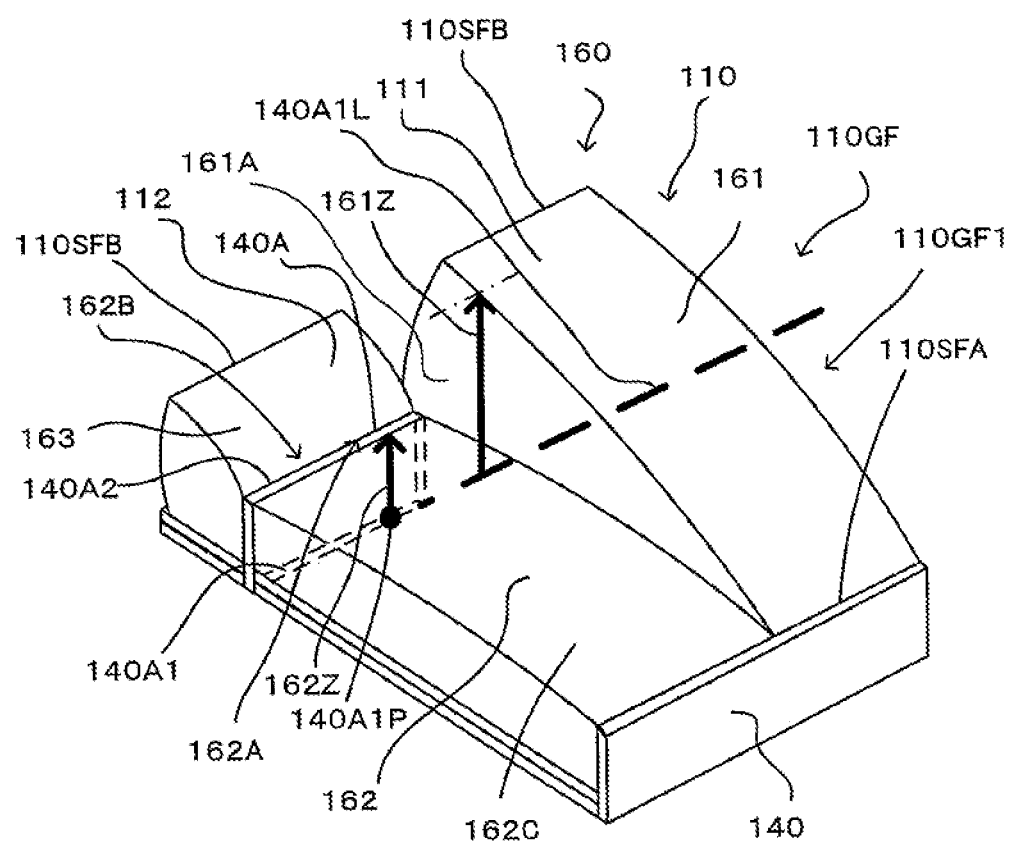
FIG. 6 is an explanatory drawing showing components of the brush part.
Figure 6:
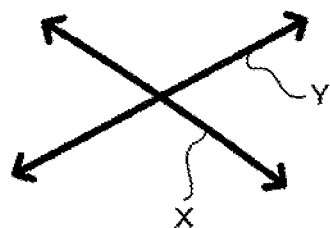

The second brush region 112 is longer than the first brush region 111, which is explained with reference to FIG. 5.

The longest distance in the transverse direction X between an end 111B of the first brush region 111 in the transverse direction X and the longitudinal center line YCL is defined as a first brush region length 111D.

The longest distance in the transverse direction X between an end 112B of the second brush region 112 in the transverse direction X and the longitudinal center line YCL is defined as a second brush region length 112D.

The second brush region 112 being longer than the first brush region 111 means that the second brush region length 112D is longer than the first brush region length 111D.

The first brush region length 111D and the second brush region length 112D are example embodiments that correspond to the "first brush region length" and the "second brush region length", respectively, according to this invention.

The second brush region 112 longer than the first brush region 111 forms the protruding region 112L.

In the cleaning element 100 of this invention, the fibers 110SF are flexible. Therefore, when used by a user, the fibers 110SF deform. As a result, the relation that the second brush region length 112D is longer than the first brush region length 111D may not be formed.

The protruding region 112L exhibits a prescribed effect when a user uses the cleaning tool A. Therefore, it is sufficient to form the above-described relation between the first brush region length 111D and the second brush region length 112D immediately after production of the cleaning element 100, immediately after a user takes out the cleaning element 100 for the first time after purchase, or immediately after a user shakes the cleaning element 100 well enough to increase the distance between the fibers 110SF and make the cleaning element 100 bulky when using the cleaning element 100.

In the cleaning element 100 according to this embodiment, the first brush region 111 is provided on the end 100B in the longitudinal direction Y, and the first brush regions 111 and the second brush regions 112 are alternately arranged.

It may however be configured to have the second brush region 112 on the end 100B in the longitudinal direction Y, or to have one first brush region 111 and one second brush region 112.

The brush part 110 has a contact region 160 for contact with an object to be cleaned. The contact region 160 is explained with reference to FIG. 6.

The contact region 160 has a first contact region 161, a second contact region 162 and a third contact region 163. The first contact region 161 is formed in the first brush region 111. The second contact region 162 is formed between the central bonded part 140 and the lateral bonded part 140A in the second brush region 112. The third contact region 163 is formed between the lateral bonded part 140A and the open end 110SFB in the second brush region 112.

The second contact region 162 has a low region 162A lower than the first contact region 161 in the thickness direction Z. The low region 162A forms a guide region 162B which is capable of guiding dust on an object to be cleaned to the adjacent first contact region 161.

The low region 162A and the guide region 162B are formed as a region including the lateral bonded part 140A which is a boundary between the second contact region 162 and the third contact region 163. Therefore, the low region 162A and the guide region 162B can also be considered as being formed in the third contact region 163. Further, the low region 162A and the guide region 162B can also be considered as being formed between the second contact region 162 and the third contact region 163.

In the following description, for the sake of convenience, the low region 162A and the guide region 162B are mainly considered as being formed in the second contact region 162.

The low region 162A of the second contact region 162 being lower than the first contact region 161 in the thickness direction Z is now explained.

The lateral bonded part 140A has a non-contact side region 140A1 on the side opposite to the contact region 160, and a contact side region 140A2 on the contact region 160 side. The shortest distance between the non-contact side region 140A1 and the contact side region 140A2 in the thickness direction Z is defined as a second contact region height 162Z.

A point on the non-contact side region 140A1 of the lateral bonded part 140A where the second contact region height 162Z is obtained is defined as a height measuring point 140A1P. A line passing through the height measuring point 140A1P in parallel to the longitudinal direction Y is defined as a height measuring line 140A1L. The longest distance between the height measuring line and the first contact region 161 in the thickness direction Z is defined as a first contact region height 161Z.

Specifically, the second contact region 162 being lower than the first contact region 161 in the thickness direction Z means that the second contact region height 162Z is lower than the first contact region height 161Z.

In the cleaning element 100 of this invention, the fibers 110SF are flexible. Therefore, when used by a user, the fibers 110SF deform. As a result, the relation that the second contact region height 162Z is lower than the first contact region height 161Z may not be formed.

The low region 162A exhibits a prescribed effect when a user uses the cleaning tool A. Therefore, it is sufficient to form the above-described relation between the first contact region height 161Z and the second contact region height 162Z immediately after production of the cleaning element 100, immediately after a user takes out the cleaning element 100 when using the product for the first time after purchase, or immediately after a user shakes the cleaning element 100 so as to increase the distance between the fibers 110SF and make the cleaning element 100 bulky when using the cleaning element 100.

Thus, the low region 162A includes the contact side region 140A2 of the lateral bonded part 140A. Further, the guide region 162B is a region parallel to the longitudinal direction Y in the low region 162A. An extension of the guide region 162B comes in contact with the side of the first contact region 161. Therefore, dust on the object to be cleaned which has passed the guide region 162B can be easily captured in a side surface region 161A of the first contact region 161.

The fibers 110SF forming the second contact region 162 are fixed at the both ends by the central bonded part 140 and the lateral bonded part 140A. Therefore, the movable range of the fibers 110SF forming the second contact region 162 is shorter than that of the fibers 110SF forming the first contact region 161 and the fibers 110SF forming the third contact region 163. Therefore, when using the cleaning tool A, the user can apply resistance, for example, to dust sticking to the object to be cleaned. Thus, the second contact region 162 is defined as a resistance region 162C which is capable of applying resistance to dust on the object to be cleaned.

The cleaning element 100 has strips 150. The strips 150 include first strips 151 formed between a plurality of cuts in the end regions of the base 120 in the transverse direction X, and second strips 152 formed between a plurality of cuts in the end regions of the second sheet element 122 in the transverse direction X. The cuts in the base 120 and the second sheet element 122 are formed in zigzag. By provision of the zigzag strips 150, a structure having an excellent cleaning function, or particularly a function capable of easily catching and capturing dust or dirt can be realized. Further, the strips 150 may have a single kind or plural kinds of shapes appropriately selected from various shapes, such as zigzag, linear and curved shapes.

As the strips 150, only either one of the first strips 151 and the second strips 152 may be used.

(Engagement of the Cleaning Element Holder and the Cleaning Element)

Figure 9:
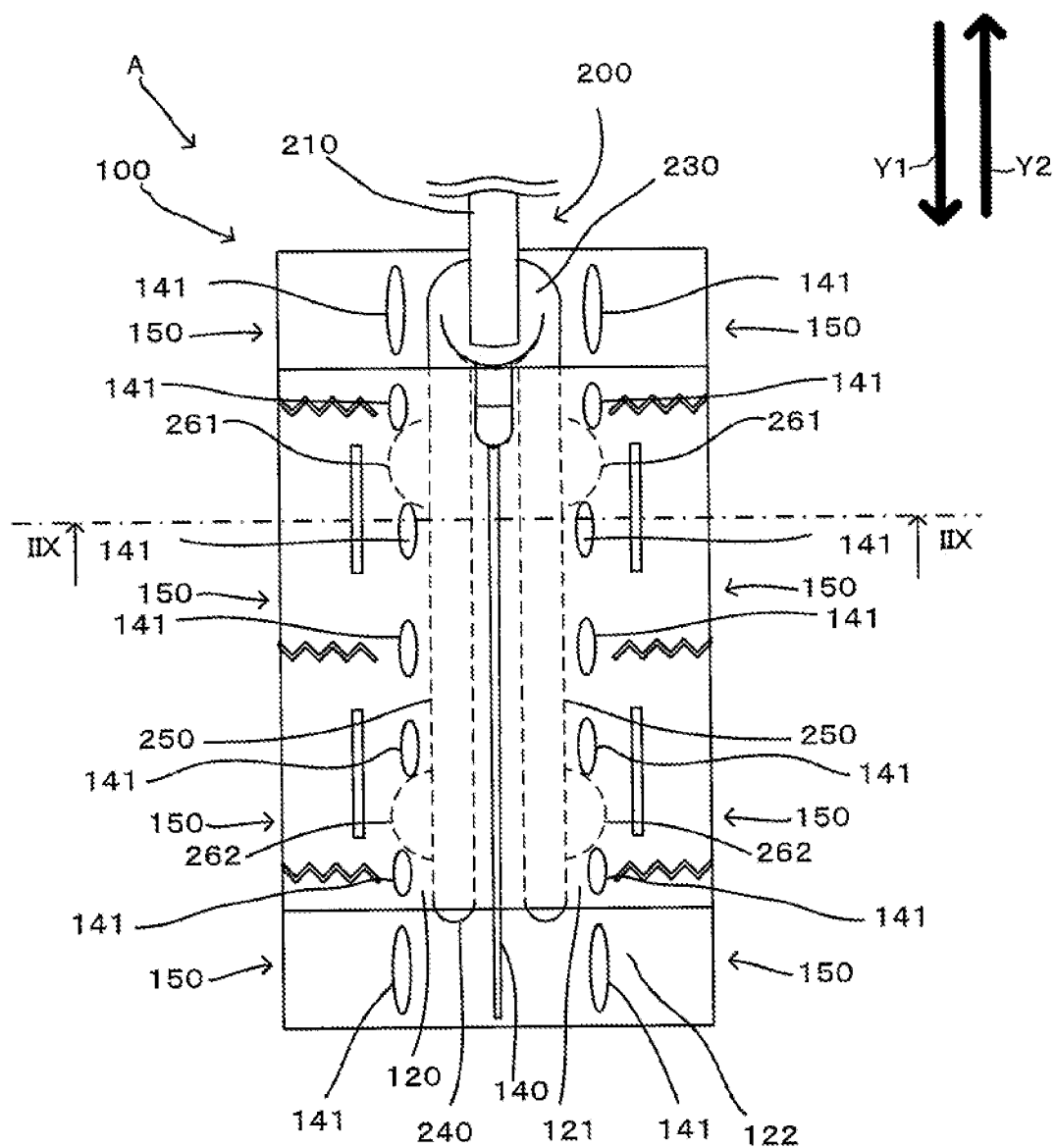
FIG. 9 is a drawing for showing engagement of the cleaning element holder with the cleaning element.
Figure 10:
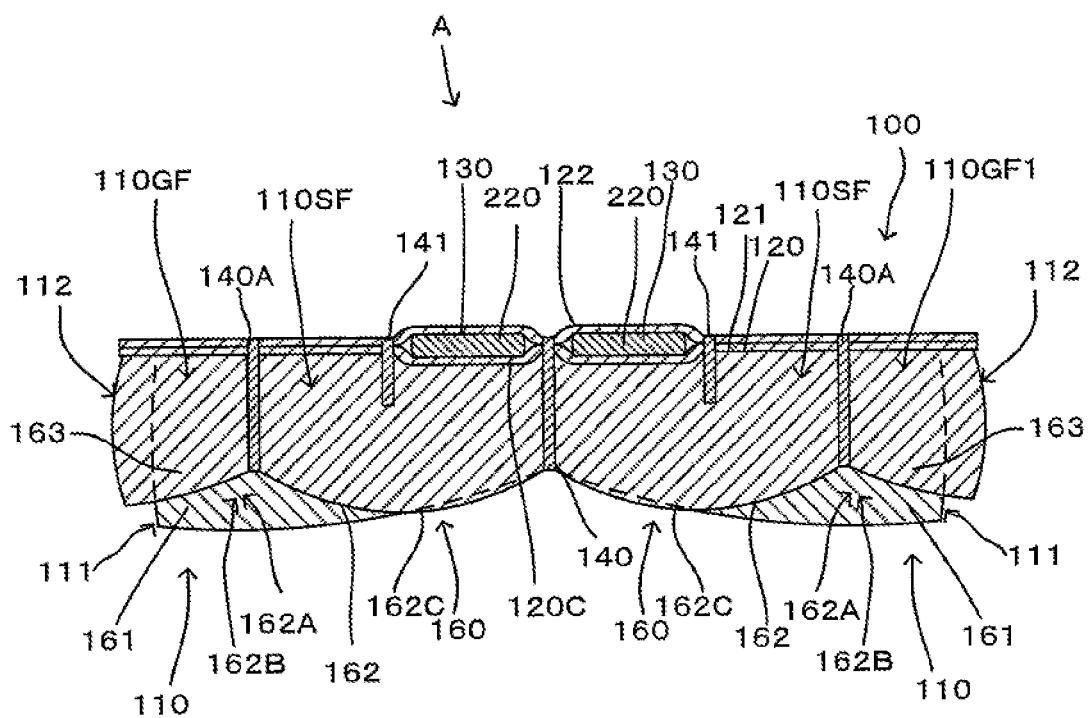
FIG. 10 is a sectional view taken along line IIX-IIX in FIG. 9.

Engagement of the cleaning element holder 200 and the cleaning element 100 is explained with reference to FIGS. 9 and 10. As shown in FIG. 9, the holding members 221 can be inserted into the holding spaces 130. The cleaning element 100 is held by the cleaning element holder 200 by inserting the holding members 221 into the holding spaces 130 along the inserting direction Y1. In order to disengage the cleaning element holder 200 and the cleaning element 100 from each other, the cleaning element holder 200 is pulled out of the holding spaces 130 along the pulling-out direction Y2.

When the cleaning element holder 200 and the cleaning element 100 are engaged with each other, the projection 260 is located between the adjacent first bonded parts 141. As a result, the engagement between the cleaning element holder 200 and the cleaning element 100 is reliably maintained.

Further, the second sheet element 122 is held between the retaining plate 270 and the holding members 221.

(Operation)

Operation of the cleaning tool A according to this embodiment is now explained. When cleaning by using the end 100A of the cleaning element 100 in the transverse direction X, the protruding region 112L of the second brush region 112 is placed in contact with the object to be cleaned, and the cleaning element 100 can be moved in a direction generally along the longitudinal direction Y. In this manner, dust on the object to be cleaned can be scraped out.

In a structure in which a plurality of the protruding regions 112L are provided, the protruding regions 112L can be successively brought in contact with the object to be cleaned. Thus, the cleaning effect can be further improved.

Figure 11:
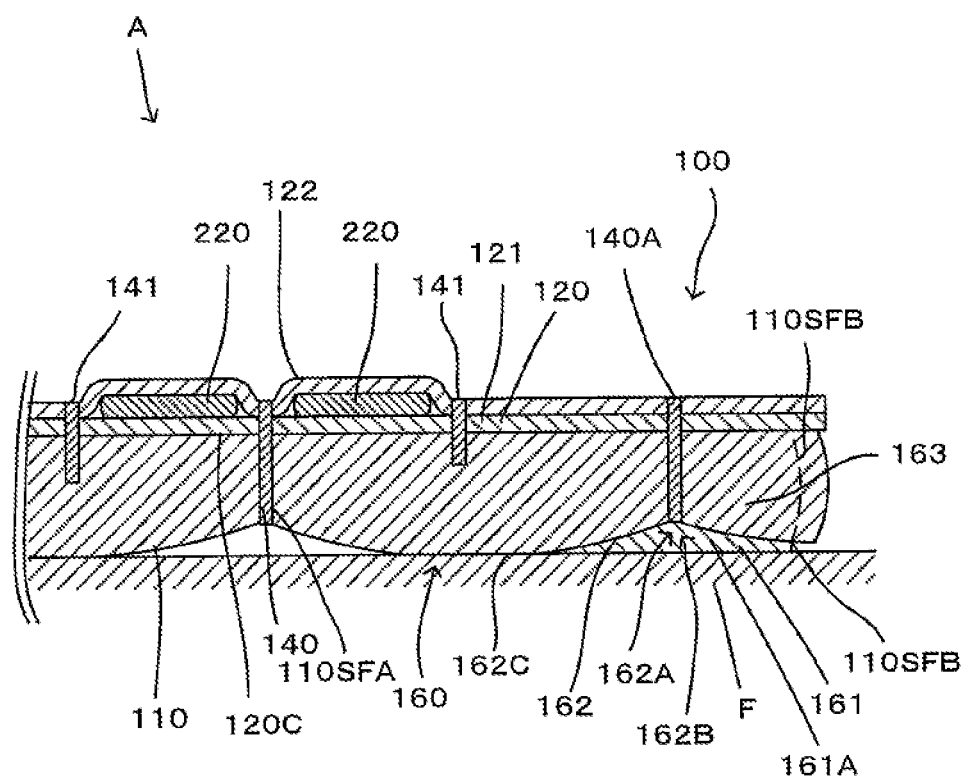
FIG. 11 is an explanatory drawing for illustrating the operation of the cleaning tool according to the embodiment of the present invention.

A cleaning work which is performed with the contact region 160 pressed in wide contact with an object to be cleaned is explained with reference to FIG. 11. When cleaning, for example, floor F, a user holds the handle 211 and presses the contact region 160 of the cleaning element 100 against the floor F. The user then moves the cleaning element 100 on the floor F. At this time, if, for example, dust is not completely captured with the surface of the first contact region 161, the dust which is not captured with the first contact region 161 is transferred to the guide region 162B of the low region 162A by user's cleaning work. The dust transferred to the guide region 162B is captured with the second contact region 162 or the third contact region 163. Further, the dust which is not captured with the second contact region 162 or the third contact region 163 is captured with the side surface region 161A of the first contact region 161.

If the cleaning element 100 is strongly pressed against the floor F, the low region 162A and the guide region 162B may be crushed because the fibers 110SF are flexible. When the cleaning tool A is used within a range in which the low region 162A and the guide region 162B are formed, the cleaning tool A is considered as constituting the present invention, provided it is capable of capturing dust.

Further, if, for example, dust sticking to the floor F is not captured by dusting in a normal cleaning work, the user can perform the cleaning work while pressing the resistance region 162C against the dust sticking to the floor F. As a result, the dust is separated from the floor F by the fibers 110SF which have a short movable range in the resistance region 162C.

Specifically, in the cleaning tool A of the present invention, a dust scraping-out work can be improved by the protruding region 112L. Further, the chance of capturing dust with the fiber assembly 110GF can be increased by the low region 162A and the guide region 162B. Moreover, dust sticking to the object to be cleaned can be separated therefrom by the resistance region 162C.

(Manufacturing Process)

A method of manufacturing the cleaning tool A according to the present invention is now explained with reference to FIGS. 12 to 20. Prior to explanation of the specific manufacturing process, the fibers 110SF forming the fiber assembly 110GF according to the present invention is explained.

Figure 12:
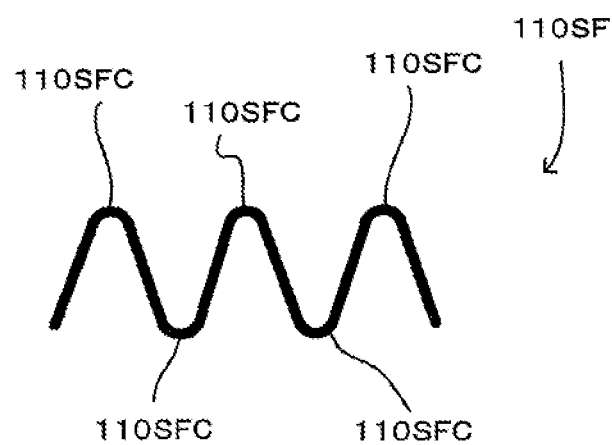
FIG. 12 is an explanatory drawing for showing the state of fibers.

FIG. 12 shows the fiber 110SF for forming the fiber assembly 110GF, in a stationary state in which an external force is not applied. The fiber 110SF is crimped and thus has a zigzag shape having a plurality of bent parts 110SFC. The bent parts 110SFC are also referred to as crimps.

Figure 13:
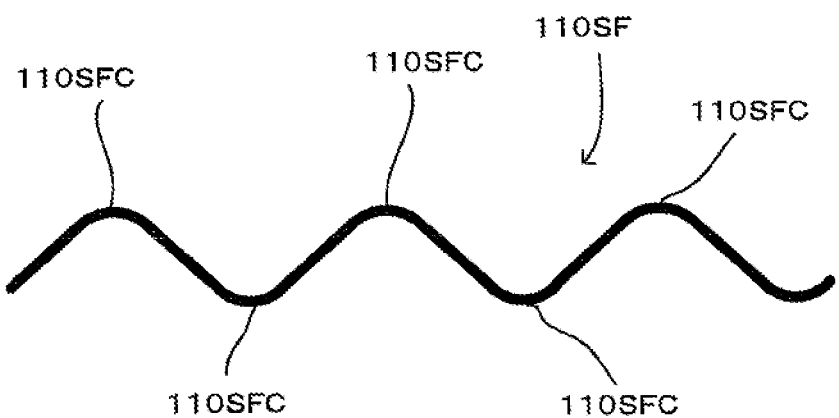
FIG. 13 is an explanatory drawing for showing the state of fibers.

The fiber 110SF having the bent parts 110SFC is stretchable. FIG. 13 shows the fiber 110SF in which an external force (tension) is applied to the both ends in a direction away from each other. The fiber 110SF thus stretches as the distance between the bent parts 110SFC increases. When the external force is released, the fiber 110SF returns from the stretched state shown in FIG. 13 to the stationary state shown in FIG. 12.

Here, the base 120 and the fiber assembly 110GF have different modulus of elasticity in tension. Specifically, the fiber assembly 110GF has a higher modulus of elasticity in tension (75.5%) than the base 120 (56.0%).

The modulus of elasticity in tension was measured by the following test.

(1) A specimen of the fiber assembly 110GF and a specimen of the base 120 are prepared, each 500 mm long.

For the fiber assembly 110GF, a fiber tow formed of conjugated fibers having a sheath of polyethylene (PE) and a core of polyethylene terephthalate (PET) is used. A fiber of the fiber tow has a fineness of 3.5 dtex, and the fiber assembly has a fineness of 110,000 dtex as a whole.

For the base 120, a spunbond nonwoven fabric formed of conjugated fibers having a sheath of polyethylene (PE) and a core of polyethylene terephthalate (PET) is used. The nonwoven has a basis weight of 20 g/m² and a width of 190 mm.

(2) Marks indicating a starting end and a terminal end of a prescribed length, which is set to 200 mm, in the longitudinal direction is put on each specimen. The distance between the starting end and the terminal end is designated by L0, which is 200 mm.

(3) The upper end of each specimen is fixed by a clip.

A weight of 5 kg is hanged such that a load is applied to the entire width of the lower end of each specimen.

(4) After a lapse of 30 seconds, the distance between the marks of the starting end and the terminal end on the specimen is measured. This distance is designated by L1.

(5) The weight is removed, and subsequently, after a lapse of 30 seconds, the distance between the marks of the starting end and the terminal end on the specimen is measured. This distance is designated by L2.

(6) The modulus of elasticity in tension is obtained by multiplying the value obtained by dividing the difference between L1 and L2 by the difference between L1 and L0, by 100.

(7) This test is conducted five times and an average value is obtained.

Figure 14:
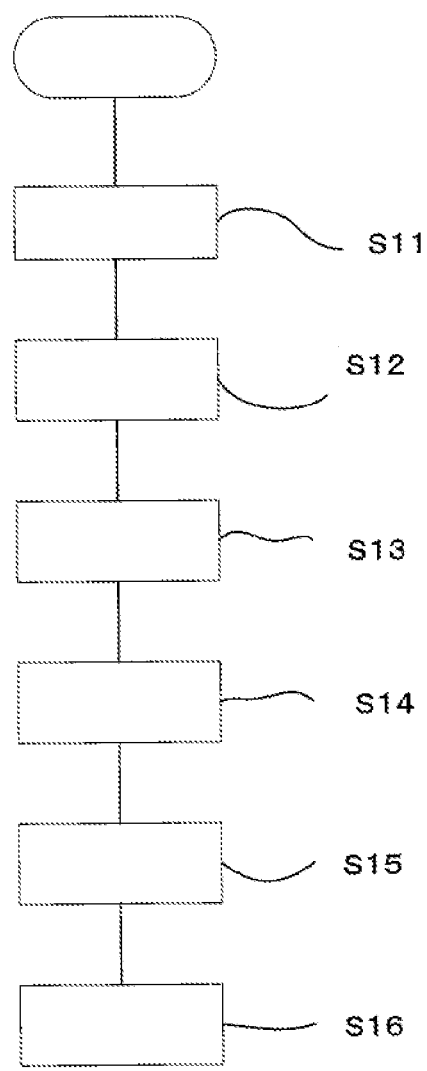
FIG. 14 is a flow chart for showing a manufacturing process according to the embodiment of the present invention.

FIG. 14 is a flow chart showing the manufacturing process. The manufacturing process includes a first step S11 of laminating materials for the base 120, the second sheet element 122 and part of the fiber assembly 110GF, a second step S12 of bonding the materials laminated in the first step S11, a third step S13 of laminating part of the fiber assembly 110GF on the materials bonded in the second step S12, a fourth step S14 of bonding the materials laminated in the third step S13, a fifth step S15 of cutting the materials bonded in the fourth step S14 into a prescribed shape, and a sixth step S16 of forming the first brush region 111 and the second brush region 112.

The cleaning element 100 of this embodiment has the strips 150, but the manufacturing process of the strips 150 is not described for convenience of explanation.

Figure 15:
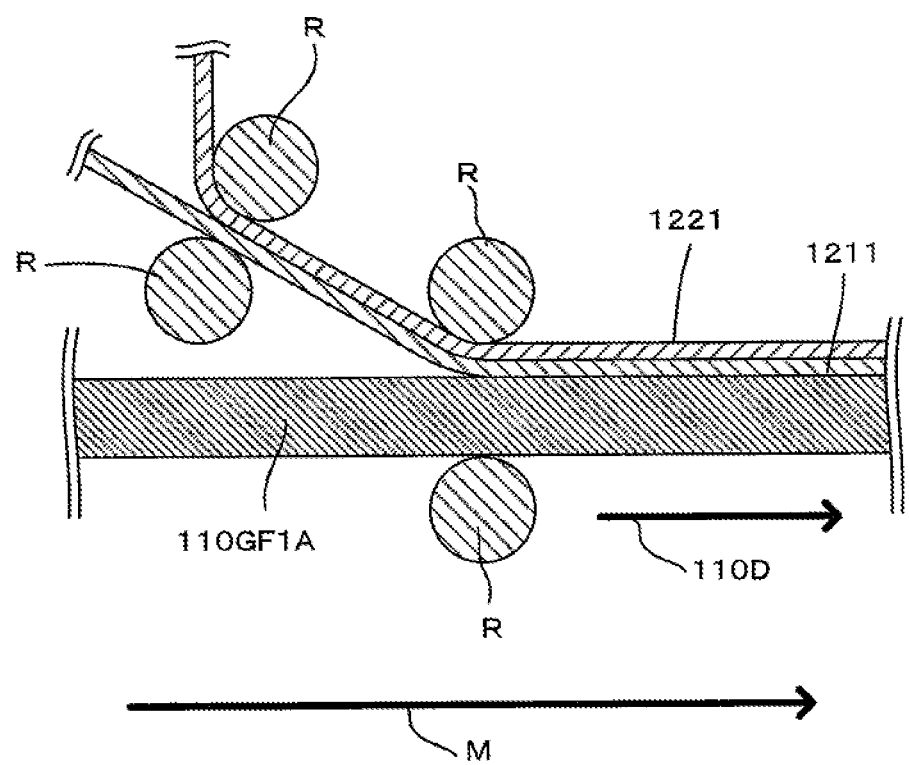
FIG. 15 is an explanatory drawing for illustrating a first step.

FIG. 15 shows the first step S11. In the first step S11, a first sheet material 1211 for forming the first sheet element 121 for the base 120, a second sheet material 1221 for forming the second sheet element 122, and a first fiber assembly material 110GF1A for forming part of the first fiber assembly 110GF1 are fed. As a result, the first fiber assembly material 110GF1A is disposed on one side of the first sheet material 1211, and the second sheet material 1221 is disposed on the other side of the first sheet material 1211.

In the manufacturing process of the present invention, each material is supported by a support roller R and transferred in the machine direction M by a driving mechanism which is not shown.

The direction of fiber orientation 110D of the first fiber assembly material 110GF1A substantially coincides with the machine direction M.

Figure 16:
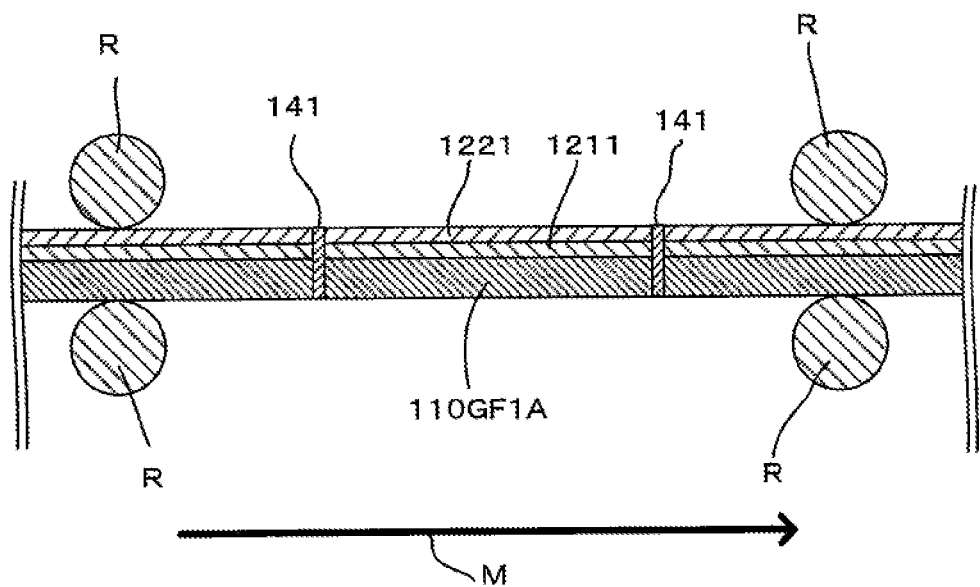
FIG. 16 is an explanatory drawing for illustrating a second step.

FIG. 16 shows the second step S12. In the second step S12, the second sheet material 1221, the first sheet material 1211 and the first fiber assembly material 110GF1A are all welded. At this time, the second sheet material 1221, the first sheet material 1211 and the first fiber assembly material 110GF1A are welded at two parts in prescribed regions. The welded parts form a pair of the first bonded parts 141.

Figure 17:
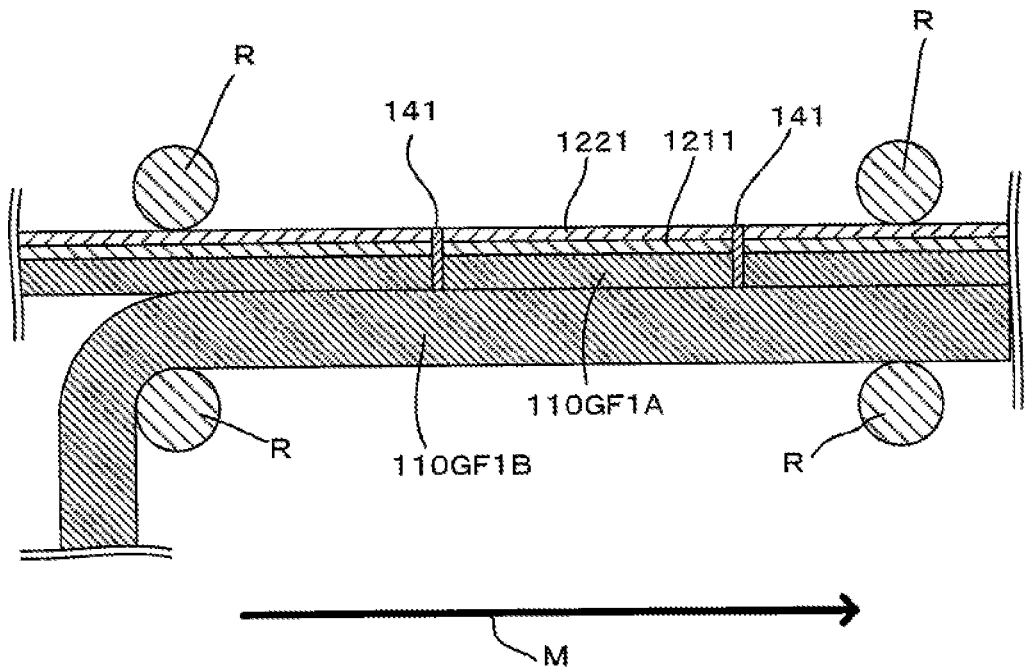
FIG. 17 is an explanatory drawing for illustrating a third step.

FIG. 17 shows the third step S13. In the third step S13, a second fiber assembly material 110GF1B is fed. The second fiber assembly material 110GF1B is fed onto one side of the first fiber assembly material 110GF1A on which the first sheet material 1211 is not disposed.

The direction of fiber orientation 110D of the second fiber assembly material 110GF1B generally coincides with the machine direction M.

Figure 18:
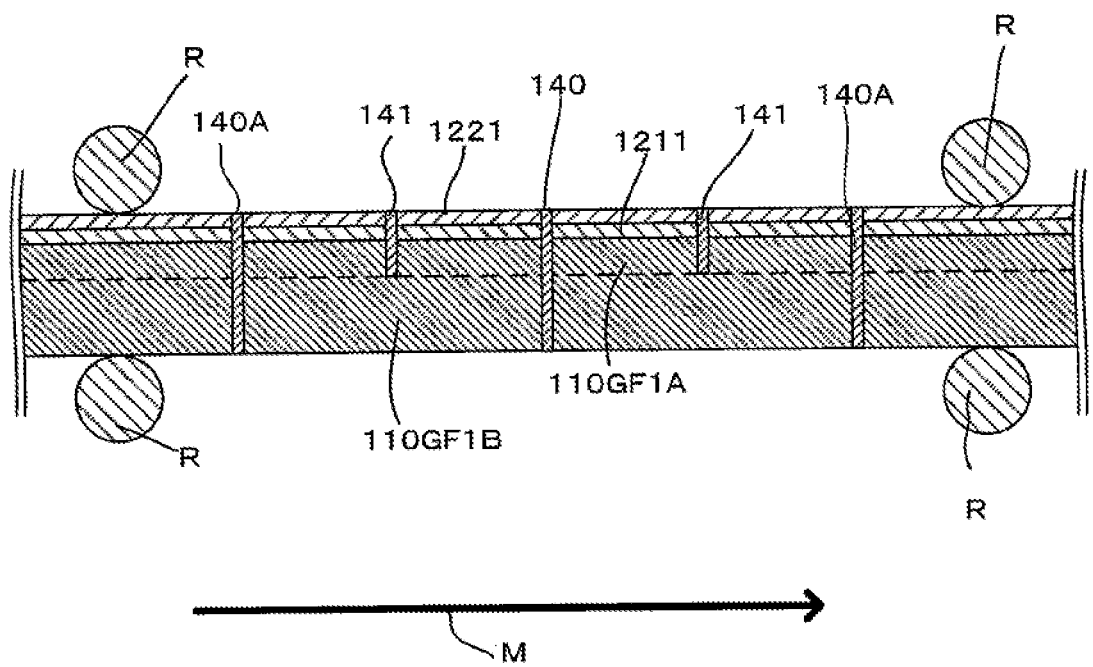
FIG. 18 is an explanatory drawing for illustrating a fourth step.

FIG. 18 shows the fourth step S14. In the fourth step S14, the second sheet material 1221, the first sheet material 1211, the first fiber assembly material 110GF1A and the second fiber assembly material 110GF1B are all bonded by heat welding. At this time, the central bonded part 140 and the lateral bonded part 140A are formed.

When the central bonded part 140 is formed, a prescribed region of the first fiber assembly 110GF1 which crosses the direction of fiber orientation 110D is bonded in its entirety.

When the lateral bonded part 140A is formed, a prescribed region of the first fiber assembly 110GF1 which crosses the direction of fiber orientation 110D is bonded in part, or specifically, welded at two positions in the direction crossing the direction of fiber orientation 110D by the lateral bonded part 140A.

The central bonded part 140 and the lateral bonded part 140A are formed by a single bonding device. In this case, the central bonded part 140 and the lateral bonded part 140A are formed substantially at the same time.

The central bonded part 140 and the lateral bonded part 140A may also be formed by separate bonding devices. In this case, the lateral bonded part 140A can be formed after the central bonded part 140 is formed, and vice versa.

In the first step S11 to the fourth step S14, a prescribed tension, particularly of 40 N, is applied to the first fiber assembly material 110GF1A.

The tension is applied to the first fiber assembly material 110GF1A and the second fiber assembly material 110GF1B in order to stabilize their shape and thereby facilitate manufacturing.

Further, in a subsequent manufacturing step which is described below, the tension is applied to shrink the fibers 110SF of the fiber assembly material 110GF and form the first brush region 111 and the second brush region 112.

Tension is also applied to the first sheet material 1211 and the second sheet material 1221 to stabilize the shape.

Figure 19:
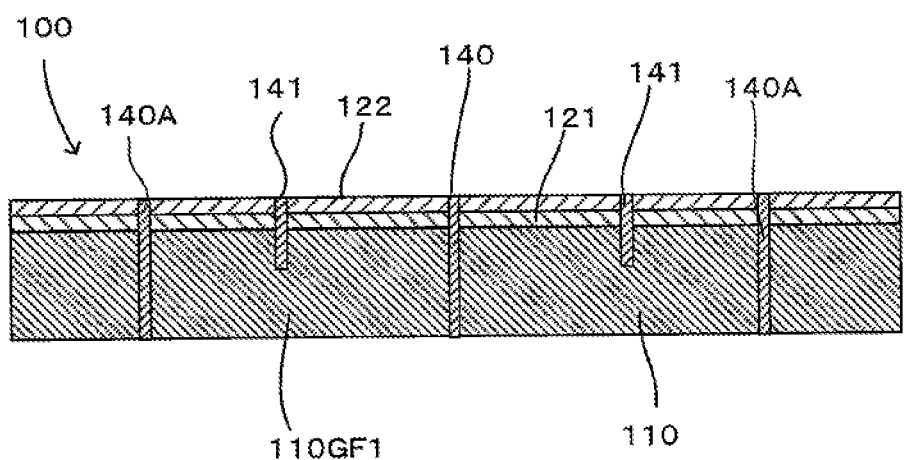
FIG. 19 is an explanatory drawing for illustrating a fifth step.

FIG. 19 shows the fifth step S15. In the fifth step S15, the second sheet material 1221, the first sheet material 1211, the first fiber assembly material 110GF1A and the second fiber assembly material 110GF1B are cut at prescribed regions. By this cutting, the second sheet material 1221, the first sheet material 1211, the first fiber assembly material 110GF1A and the second fiber assembly material 110GF1B are released from tension.

Figure 20:
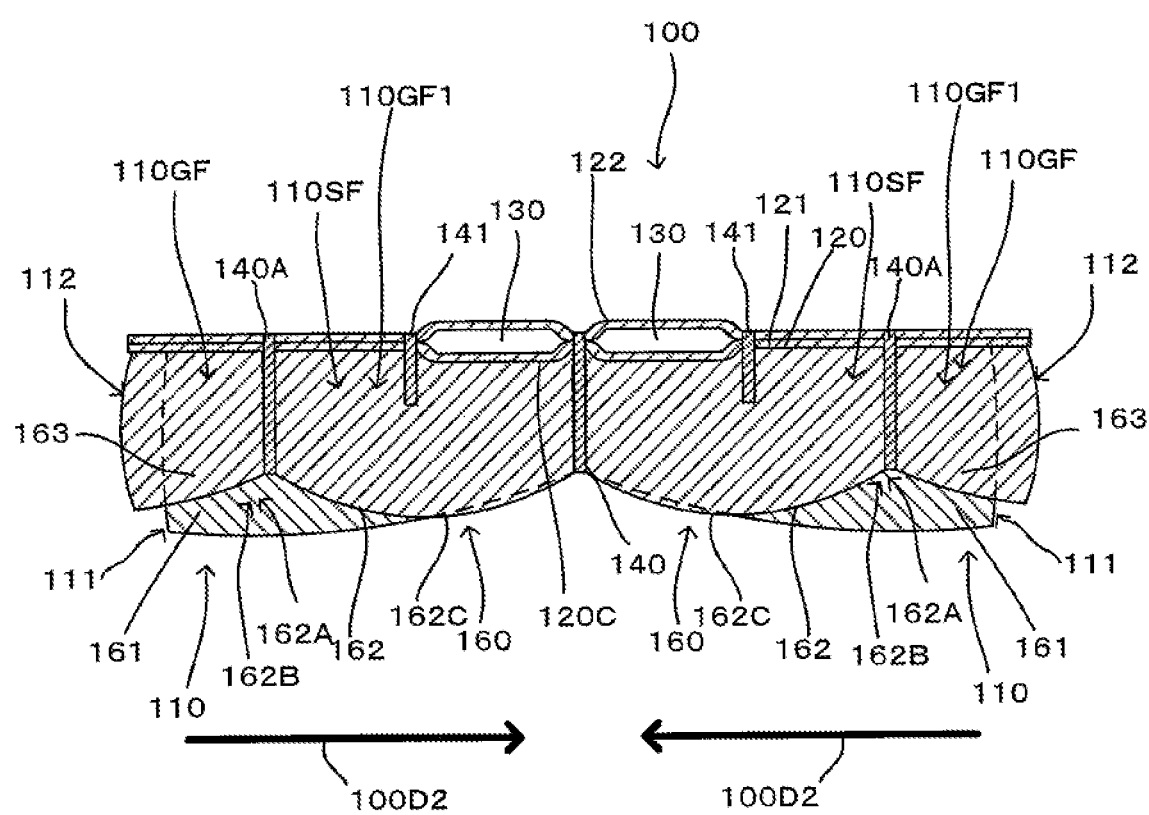
FIG. 20 is an explanatory drawing for illustrating a sixth step.

FIG. 20 shows the sixth step S16. In the sixth step S16, the fibers 110SF of the first fiber assembly material 110GF1A released from tension shrink in the inside direction 100D2 in the transverse direction X.

The fibers 110SF connected to both the central bonded part 140 and the lateral bonded part 140A are also connected to the first sheet element 121 and the second sheet element 122. Therefore, shrinkage of the fibers 110SF is restricted by the first sheet element 121 and the second sheet element 122.

The fibers 110SF connected only to the central bonded part 140 largely shrink compared with the fibers 110SF connected to the first sheet element 121 and the second sheet element 122.

As a result, the fibers 110SF connected only to the central bonded part 140 form the first brush region 111, and the fibers 110SF connected to the central bonded part 140 and the lateral bonded part 140A form the second brush region 112.

In this manner, the cleaning element 100 of the cleaning tool A according to the present invention is manufactured.

The present invention is not limited to the above-described embodiment and manufacturing method, but rather, may be added to, changed, replaced with alternatives or otherwise modified. For example, in the cleaning tool A of the above-described embodiment, the holder 200 is provided with the two holding members 221, and correspondingly the cleaning element 100 is provided with the two holding spaces 130. However, a single holding space 130 may be provided for the two holding members 221, or a single holding member 221 and a single holding space 130 may be provided.

Now, modifications to the above-described embodiment are explained. Components identical or corresponding to those in the cleaning tool A of the above-described embodiment are given like numerals and are not described.

(First Modification)

Figure 21:
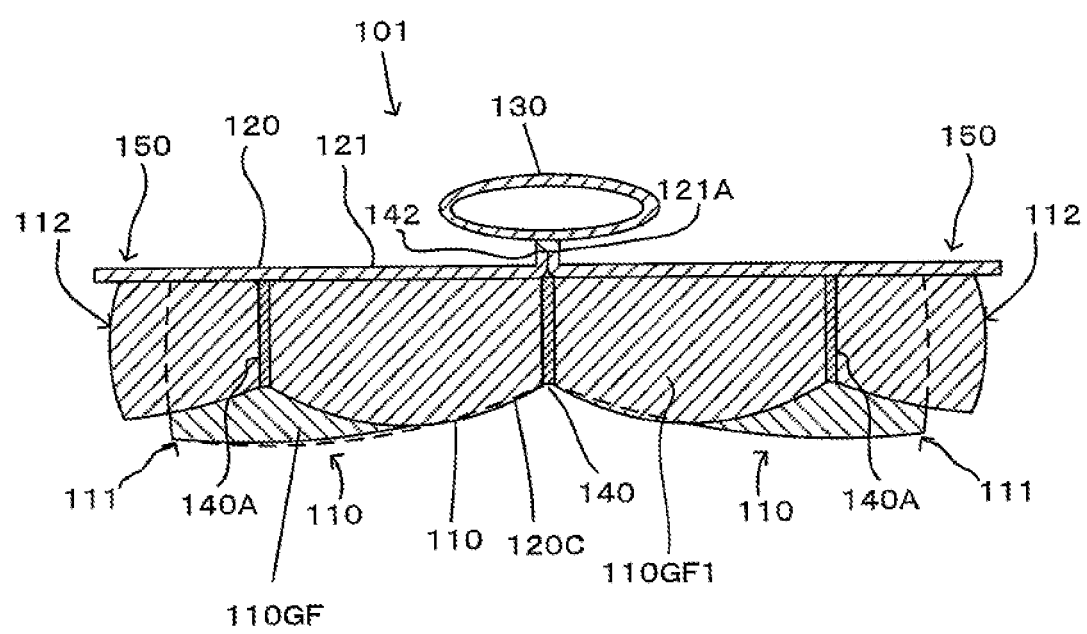
FIG. 21 is an explanatory drawing of a cleaning element according to a first modification of the present invention.

A first modification is explained with reference to FIG. 21. A cleaning element 101 of the first modification is different in the structure of the holding space 130 from the cleaning element 100 of the above-described embodiment.

In the cleaning element 101 of the first modification, the holding space 130 is formed only by the first sheet element 121 forming the base 120. Specifically, a bonding sheet region 121A is formed by contact of prescribed surfaces of the first sheet element 121 with each other. A prescribed area of the bonding sheet region 121A is then welded to form a second bonded part 142.

In this manner, the holding space 130 extending in the longitudinal direction Y is formed.

In the first modification, the central bonded part 140 bonds only the brush part 110. The brush part 110 and the base 120 can be bonded together, for example, by an adhesive (not shown).

In the cleaning element 101 of the first modification, the first brush region 111 and the second brush region 112 are also formed, so that the same effect as the cleaning element 100 of the above-described embodiment can be obtained.

(Second Modification)

Figure 22:
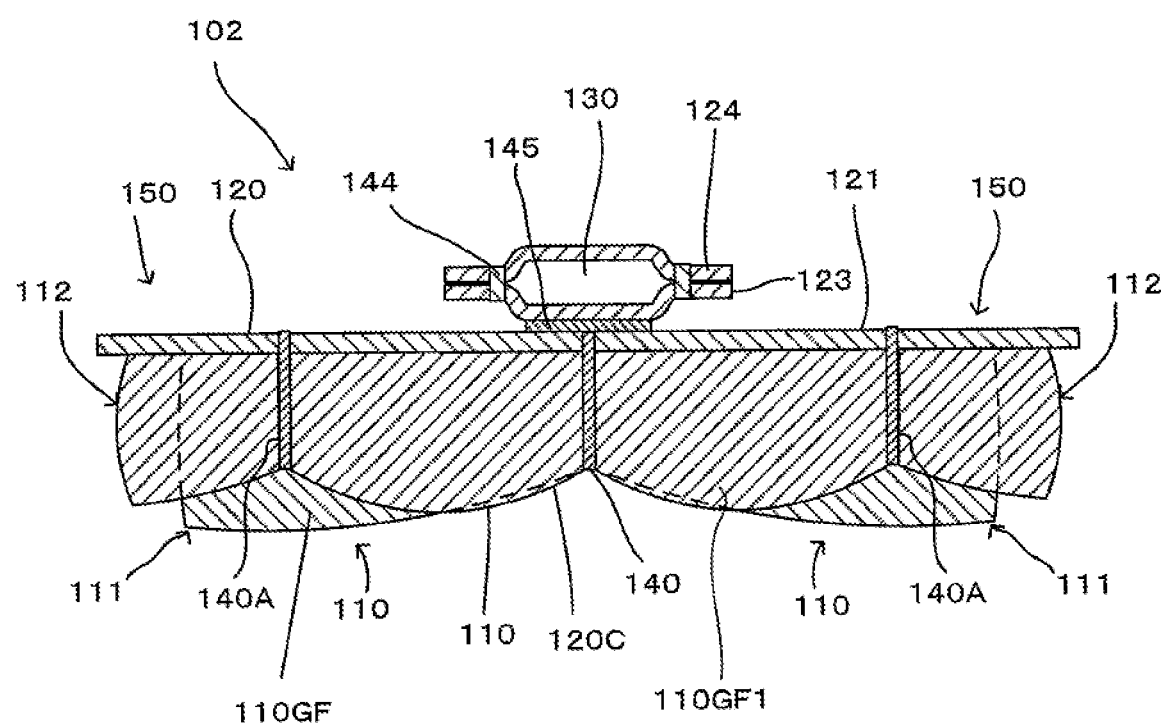
FIG. 22 is an explanatory drawing of a cleaning element according to a second modification of the present invention.

A second modification is explained with reference to FIG. 22. A cleaning element 102 of the second modification is different in the structure of the holding space 130 from the cleaning element 100 of the above-described embodiment.

In the cleaning element 102 of the second modification, the holding space 130 is formed separately from the base 120. A third sheet element 123 and a fourth sheet element 124 are superposed. Regions of the third sheet element 123 and the fourth sheet element 124 close to their ends in the transverse direction X are then welded together along the longitudinal direction Y to form a fourth bonded part 144.

In this manner, the holding space 130 extending in the longitudinal direction Y is formed between the third sheet element 123 and the fourth sheet element 124.

In the second modification, the central bonded part 140 bonds only the brush part 110 and the base 120. The third sheet element 123 is bonded to the base 120, for example, by an adhesive, to form a fifth bonded part 145.

In the cleaning element 102 of the second modification, the first brush region 111 and the second brush region 112 are also formed, so that the same effect as the cleaning element 100 of the above-described embodiment can be obtained.

(Third Modification)

Figure 23:
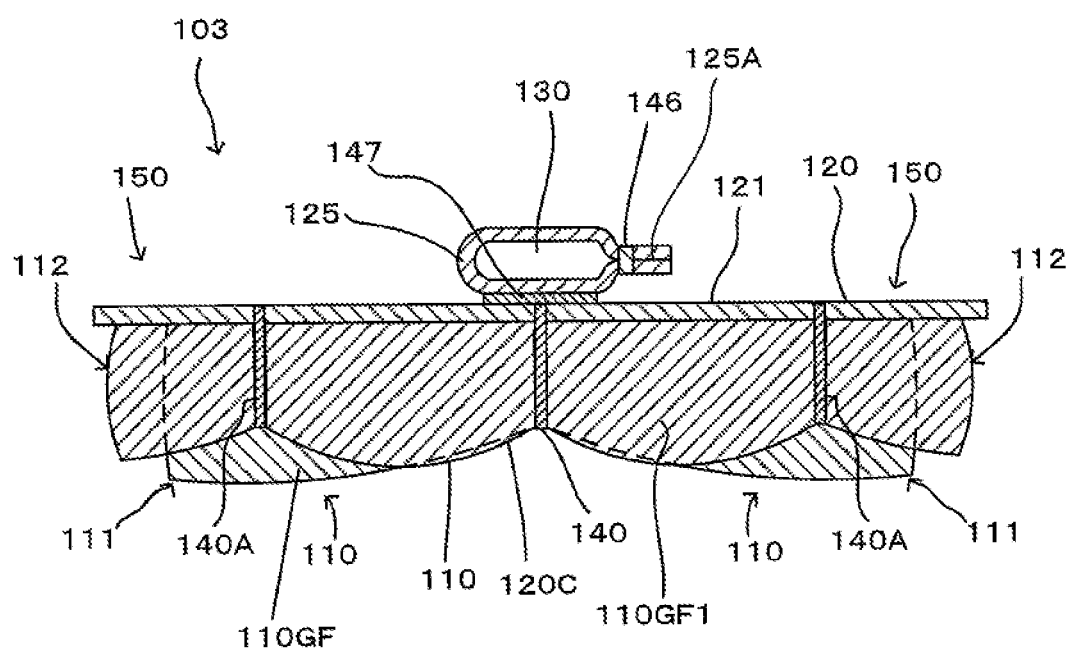
FIG. 23 is an explanatory drawing of a cleaning element according to a third modification of the present invention.

A third modification is explained with reference to FIG. 23. A cleaning element 103 of the third modification is different in the structure of the holding space 130 from the cleaning element 100 of the above-described embodiment.

In the cleaning element 103 of the third modification, the holding space 130 is formed separately from the base 120. Specifically, a bonding sheet region 125A is formed by contact of prescribed surfaces of a fifth sheet element 125 with each other. A prescribed area of the bonding sheet region 125A is then welded to form a sixth bonded part 146.

In this manner, the holding space 130 extending in the longitudinal direction Y is formed.

In the third modification, the central bonded part 140 bonds only the brush part 110 and the base 120. The fifth sheet element 125 is bonded to the base 120, for example, by an adhesive, to form a seventh bonded part 147.

In the cleaning element 103 of the third modification, the first brush region 111 and the second brush region 112 are also formed, so that the same effect as the cleaning element 100 of the above-described embodiment can be obtained.

(Fourth Modification)

Figure 24:
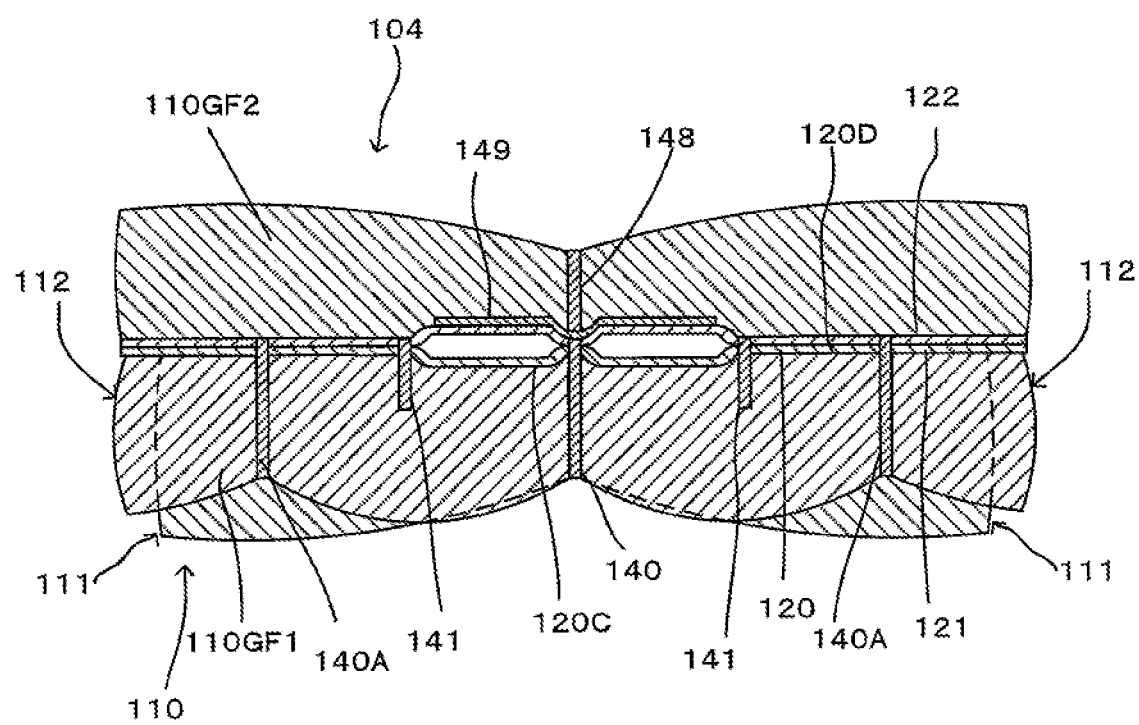
FIG. 24 is an explanatory drawing of a cleaning element according to a fourth modification of the present invention.

A fourth modification is explained with reference to FIG. 24. A cleaning element 104 of the fourth modification is different from the cleaning element 100 of the above-described embodiment in that the brush part 110 is formed not only on the one side 120C of the base 120, but also on the other side 120D of the base 120.

Specifically, a prescribed region of a second fiber assembly 110GF2 which crosses the direction of fiber orientation 110D is welded to form an eighth bonded part 148. The second fiber assembly 110GF2 is then bonded to the second sheet element 122 of the cleaning element 100 of the embodiment, for example, by an adhesive, to form a ninth bonded part 149. In this manner, the cleaning element 104 is formed.

In the cleaning element 104 of the fourth modification, the first brush region 111 and the second brush region 112 are also formed, so that the same effect as the cleaning element 100 of the above-described embodiment can be obtained.

Further, by providing the brush part 110 on the other side 120D of the base 120 as well, the user convenience is enhanced.

Naturally, the second fiber assembly 110GF2 can be configured to have the first brush region 111 and the second brush region 112, such that the protruding regions 112L, the low region 162A, the guide region 162B and the resistance region 162C can be formed.

(Fifth Modification)

Figure 25:
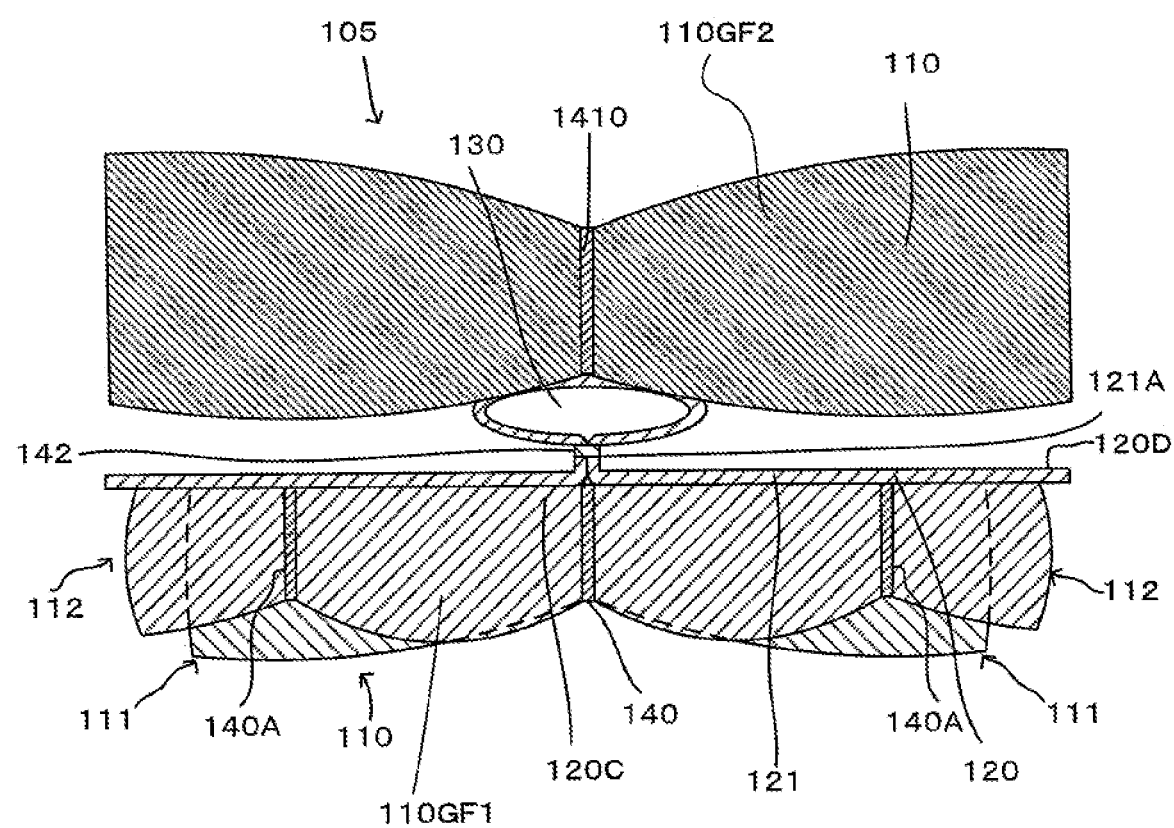
FIG. 25 is an explanatory drawing of a cleaning element according to a fifth modification of the present invention.

A fifth modification is explained with reference to FIG. 25. A cleaning element 105 of the fifth modification is different from the cleaning element 101 of the above-described first modification in that the brush part 110 is formed not only on the one side 120C of the base 120, but also on the other side 120D of the base 120.

Specifically, a second fiber assembly 110GF2 is bonded on the first sheet element 121 which forms the holding space 130. The second fiber assembly 110GF2 is welded at the central region to form a tenth bonded part 1410. The second fiber assembly 110GF2 having the tenth bonded part 1410 is then bonded to the first sheet element 121 forming the holding space 130, for example, by an adhesive (not shown). In this manner, the cleaning element 105 is formed.

In the cleaning element 105 of the fifth modification, the first brush region 111 and the second brush region 112 are also formed, so that the same effect as the cleaning element 100 of the above-described embodiment can be obtained.

Further, by providing the brush part 110 on the other side 120D of the base 120 as well, the user convenience is further enhanced compared with the cleaning element 101 of the above-described first modification.

Naturally, the second fiber assembly 110GF2 can be configured to have the first brush region 111 and the second brush region 112, such that the protruding regions 112L, the low region 162A, the guide region 162B and the resistance region 162C can be formed.

(Sixth Modification)

Figure 26:
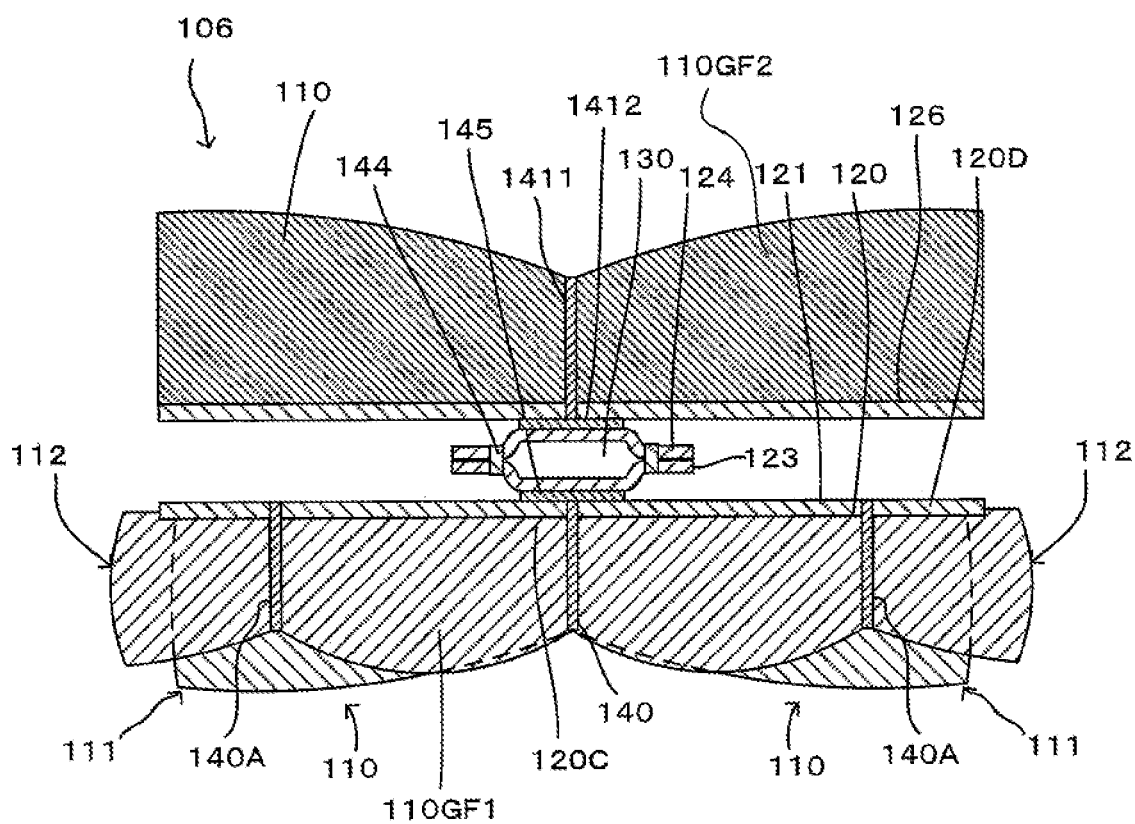
FIG. 26 is an explanatory drawing of a cleaning element according to a sixth modification of the present invention.

A sixth modification is explained with reference to FIG. 26. A cleaning element 106 of the sixth modification is different from the cleaning element 102 of the above-described second modification in that the brush part 110 is formed not only on the one side 120C of the base 120, but also on the other side 120D of the base 120.

Specifically, a second fiber assembly 110GF2 and a sixth sheet element 126 are welded together at the central region to form an 11th bonded part 1411. A side of the sixth sheet element 126 on which the second fiber assembly 110GF2 is not disposed is bonded to the fourth sheet element 124, for example, by an adhesive, to form a 12th bonded part 1412. In this manner, the cleaning element 106 is formed.

In the cleaning element 106 of the sixth modification, the first brush region 111 and the second brush region 112 are also formed, so that the same effect as the cleaning element 100 of the above-described embodiment can be obtained.

Further, by providing the brush part 110 on the other side 120D of the base 120 as well, the user convenience is further enhanced compared with the cleaning element 102 of the above-described second modification.

Naturally, the second fiber assembly 110GF2 can be configured to have the first brush region 111 and the second brush region 112, such that the protruding regions 112L, the low region 162A, the guide region 162B and the resistance region 162C can be formed.

(Seventh Modification)

Figure 27:
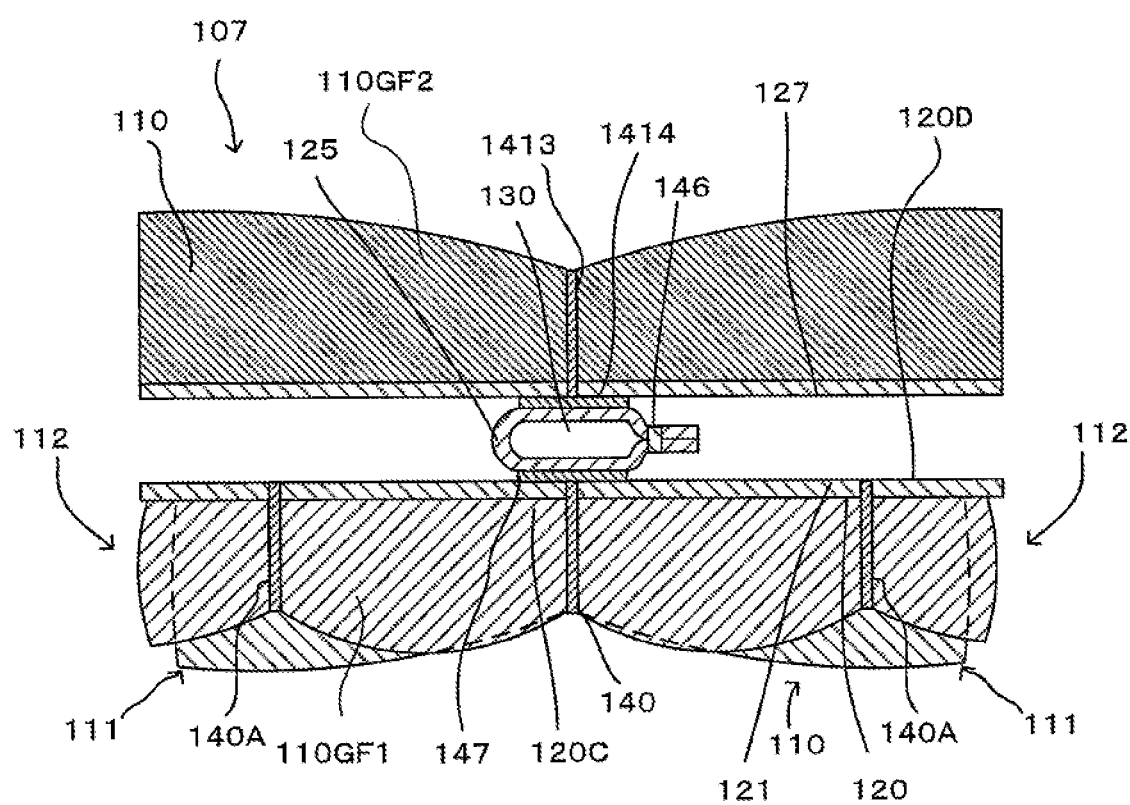
FIG. 27 is an explanatory drawing of a cleaning element according to a seventh modification of the present invention.

A seventh modification is explained with reference to FIG. 27. A cleaning element 107 of the seventh modification is different from the cleaning element 103 of the above-described third modification in that the brush part 110 is formed not only on the one side 120C of the base 120, but also on the other side 120D of the base 120.

Specifically, a second fiber assembly 110GF2 and a seventh sheet element 127 are welded together at the central region to form a 13th bonded part 1413. A side of the seventh sheet element 127 on which the second fiber assembly 110GF2 is not disposed is bonded to the fifth sheet element 125, for example, by an adhesive, to form a 14th bonded part 1414. In this manner, the cleaning element 107 is formed.

In the cleaning element 107 of the seventh modification, the first brush region 111 and the second brush region 112 are also formed, so that the same effect as the cleaning element 100 of the above-described embodiment can be obtained.

Further, by providing the brush part 110 on the other side 120D of the base 120 as well, the user convenience is further enhanced compared with the cleaning element 103 of the above-described third modification.

Naturally, the second fiber assembly 110GF2 can be configured to have the first brush region 111 and the second brush region 112, such that the protruding regions 112L, the low region 162A, the guide region 162B and the resistance region 162C can be formed.

(Eighth Modification)

Figure 28:
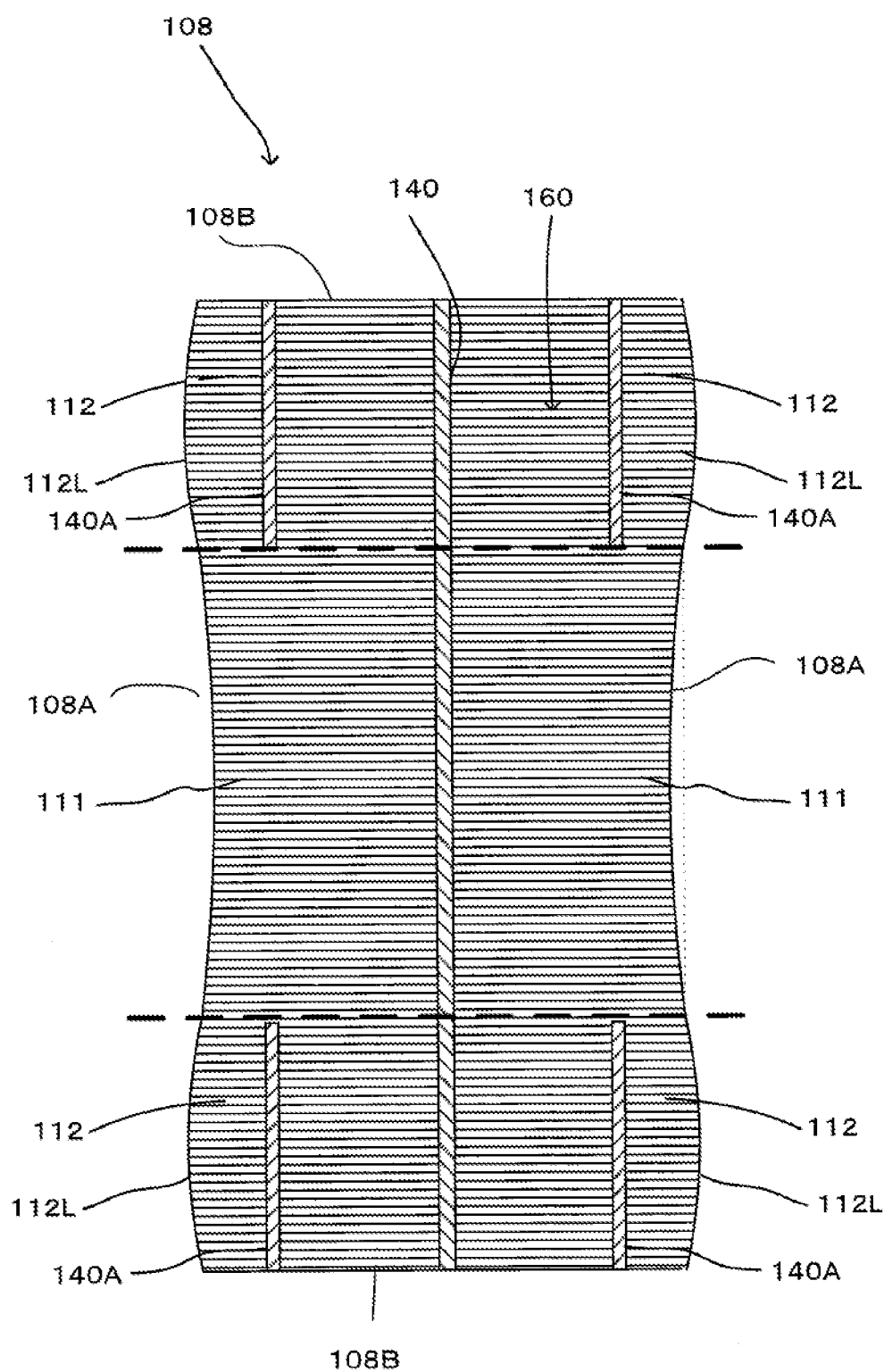
FIG. 28 is an explanatory drawing of a cleaning element according to an eighth modification of the present invention.

An eighth modification is explained with reference to FIG. 28. A cleaning element 108 of the eighth modification is different from the cleaning element 100 of the above-described embodiment in that the second brush region 112 is formed on ends 108B of the cleaning element 108 in the longitudinal direction Y.

In the cleaning element 108 of the eighth modification, the first brush region 111 and the second brush region 112 are also formed, so that the same effect as the cleaning element 100 of the above-described embodiment can be obtained.

(Ninth Modification)

Figure 29:
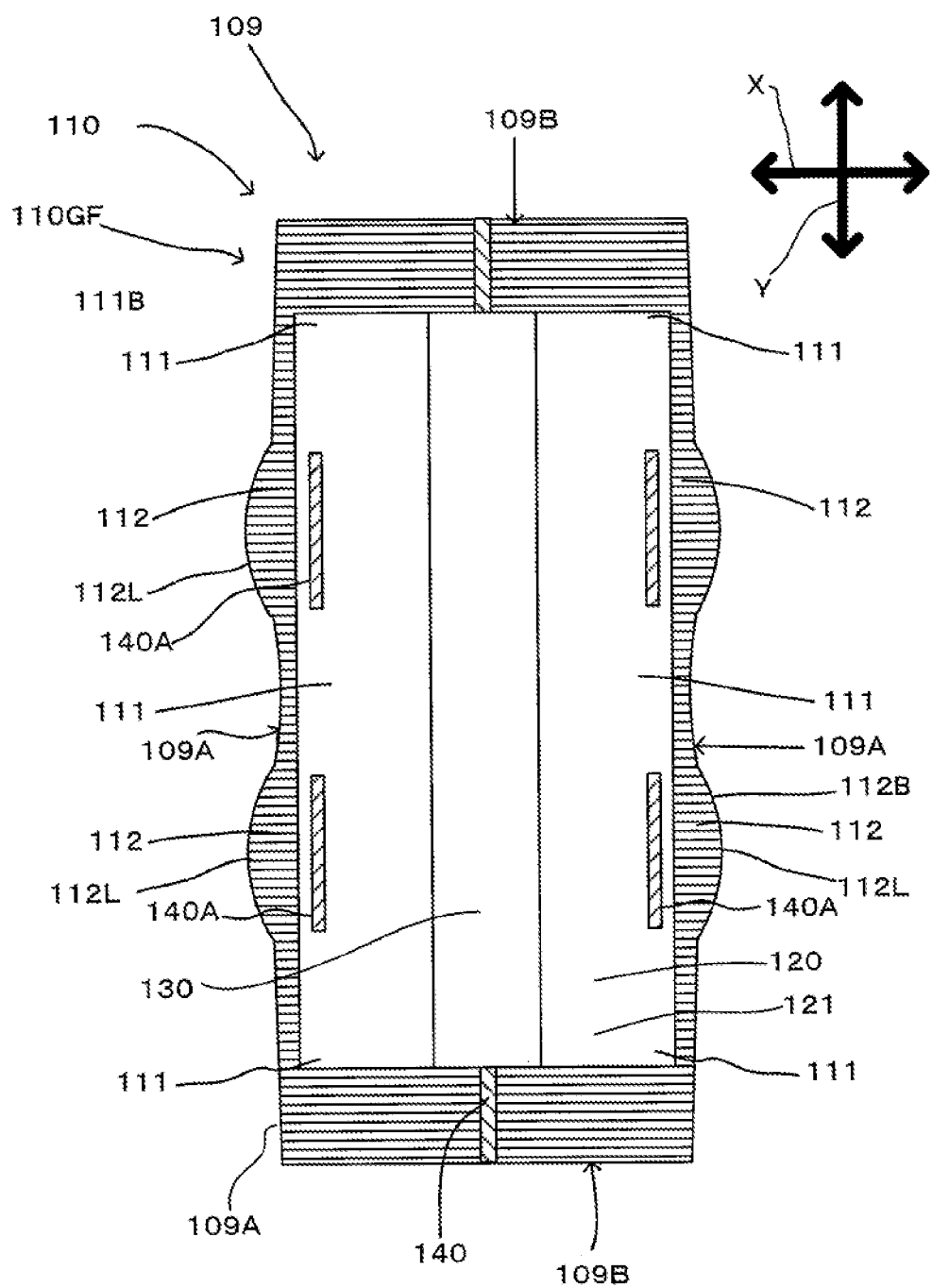
FIG. 29 is an explanatory drawing of a cleaning element according to a ninth modification of the present invention.

A ninth modification is explained with reference to FIG. 29. A cleaning element 109 of the ninth modification is different from the cleaning element 100 of the above-described embodiment in that the brush part 110 and the base 120 have different lengths. Specifically, the brush part 110 is longer than the base 120 in the longitudinal direction Y. Further, the brush part 110 is longer than the base 120 in the transverse direction X as well. Such a structure can be realized by a cleaning element having a structure, for example, like the cleaning element 101 of the first modification shown in FIG. 21. Specifically, the brush part 110 and the holding space 130 are separately formed. At this time, the base 120 forming the holding space 130 is formed in an arbitrary size. Thereafter, the brush part 110 and the base 120 are bonded together. In this manner, the cleaning element 109 of the ninth modification is formed.

In the cleaning element 109 of the ninth modification, the first brush region 111 and the second brush region 112 are also formed, so that the same effect as the cleaning element 100 of the above-described embodiment can be obtained.

Further, the first brush region 111 is formed on ends 109A of the cleaning element 109 in the transverse direction X. Further, the second brush region 112 is also formed on the ends 109A of the cleaning element 109 in the transverse direction X. Therefore, when the end 109A of the cleaning element 109 in the transverse direction X is brought in contact with an object to be cleaned, the dust capturing effect can be enhanced.

Embodiments and modifications of the present invention are not limited to those described above. The structures or features of the above-described embodiment and modifications can be appropriately used in combination, and can be added to, changed, replaced with alternatives or otherwise modified.

(Correspondences Between the Features of the Embodiment and the Features of the Invention)

The cleaning tool A is an example embodiment that corresponds to the "cleaning tool" according to this invention. The cleaning element 100, 101, 102 is an example embodiment that corresponds to the "cleaning sheet" according to this invention. The cleaning element holder 200 is an example embodiment that corresponds to the "holder" according to this invention. The longitudinal direction Y and the transverse direction X are example embodiments that correspond to the "longitudinal direction" and the "transverse direction", respectively, according to this invention. The cleaning element holding part 220 is an example embodiment that corresponds to the "holding part" according to this invention. The handle part 210 is an example embodiment that corresponds to the "grip part" according to this invention. The ends 100B and the ends 100A are example embodiments that correspond to the "ends in the longitudinal direction" and the "ends in the transverse direction", respectively, according to this invention. The brush part 110 is an example embodiment that corresponds to the "brush part" according to this invention. The base 120 is an example embodiment that corresponds to the "base" according to this invention. The fiber assembly 110GF is an example embodiment that corresponds to the "fiber assembly" according to this invention. The first brush region 111 is an example embodiment that corresponds to the "first brush region" according to this invention. The second brush region 112 is an example embodiment that corresponds to the "second brush region" according to this invention. The protruding region 112L is an example embodiment that corresponds to the "protruding region" according to this invention. The longitudinal center line YCL is an example embodiment that corresponds to the "longitudinal center line" according to this invention. The first brush region length 111D is an example embodiment that corresponds to the "first brush region length" according to this invention. The second brush region length 112D is an example embodiment that corresponds to the "second brush region length" according to this invention. The lateral bonded part 140A is an example embodiment that corresponds to the "brush region bonded part" according to this invention. The fiber 110SF is an example embodiment that corresponds to the "fiber" according to this invention. The first sheet element 121, the second sheet element 122, the third sheet element 123, the fourth sheet element 124, the fifth sheet element 125 and the sixth sheet element 126 are example embodiments that correspond to the "first sheet element", the "second sheet element", the "third sheet element", the "fourth sheet element", the "fifth sheet element" and the "sixth sheet element", respectively, according to this invention. The one side 120C and the other side 120D are example embodiments that correspond to the "one side" and "the other side", respectively, according to this invention.

Embodiments and modifications of the present invention are not limited to those described above. The structures or features of the above-described embodiment and modifications can be appropriately used in combination, and can be added to, changed, replaced with alternatives or otherwise modified.

In view of the nature of the above-described invention, a cleaning tool according to this invention can be provided with various features as follows.

(Aspect 1)

A cleaning tool, having a cleaning sheet and a holder for holding the cleaning sheet, wherein:

the cleaning sheet is configured to extend in a longitudinal direction which is defined by a direction of insertion of the holder into the cleaning sheet, and in a transverse direction which is defined by a direction crossing the longitudinal direction, the holder has a holding part for holding the cleaning sheet, and a grip part which is connected to the holding part and designed to be held by a user, the cleaning sheet has ends in the longitudinal direction, ends in the transverse direction, a brush part capable of cleaning an object to be cleaned, a base connected with the brush part, and an insertion part which is formed on the base and into which the holding part is inserted, the brush part comprises a fiber assembly of fibers having the same length and having orientation in a prescribed direction and includes a first brush region and a second brush region, and the second brush region is configured to be longer than the first brush region and has a protruding region.

(Aspect 2)

The cleaning tool as defined in aspect 1, comprising:

a longitudinal center line which is a line passing in the longitudinal direction through a center in the transverse direction, a first brush region length which is the longest distance in the transverse direction between an end of the first brush region in the transverse direction and the longitudinal center line, and a second brush region length which is the longest distance in the transverse direction between an end of the second brush region in the transverse direction and the longitudinal center line, wherein:

the second brush region length is longer than the first brush region length.

(Aspect 3)

The cleaning tool as defined in aspect 1 or 2, wherein the second brush region is formed in a direction crossing a direction of orientation of the fiber assembly, and has a brush region bonded part which bonds a prescribed region of the fiber assembly.

(Aspect 4)

The cleaning tool as defined in any one of aspects 1 to 3, wherein the fibers of the fiber assembly which form the protruding region have orientation in the transverse direction.

(Aspect 5)

The cleaning tool as defined in any one of aspects 1 to 4, wherein the first brush region is provided on the ends in the longitudinal direction.

(Aspect 6)

The cleaning tool as defined in any one of aspects 1 to 4, wherein the second brush region is provided on the ends in the longitudinal direction.

(Aspect 7)

The cleaning tool as defined in any one of aspects 1 to 4, wherein the first brush region is provided on the ends in the transverse direction.

(Aspect 8)

The cleaning tool as defined in any one of aspects 1 to 4, wherein the second brush region is provided on the ends in the transverse direction.

(Aspect 9)

The cleaning tool as defined in any one of aspects 1 to 8, wherein the first brush regions and the second brush regions are alternately arranged.

(Aspect 10)

The cleaning tool as defined in any one of aspects 1 to 9, wherein the base comprises a first sheet element.

(Aspect 11)

The cleaning tool as defined in aspect 10, comprising a second sheet element which is superposed on the first sheet element, wherein the insertion part is formed between the first sheet element and the second sheet element.

(Aspect 12)

The cleaning tool as defined in aspect 10, wherein the insertion part is formed by forming a bonding sheet region by contact of prescribed surfaces of the first sheet element with each other and bonding the prescribed surfaces in the bonding sheet region.

(Aspect 13)

The cleaning tool as defined in aspect 10, comprising a third sheet element which is superposed on the first sheet element, and a fourth sheet element which is superposed on the third sheet element, wherein the insertion part is formed between the third sheet element and the fourth sheet element.

(Aspect 14)

The cleaning tool as defined in aspect 10, comprising a fifth sheet element which is superposed on the first sheet element, wherein the insertion part is formed by forming a bonding sheet region by contact of prescribed surfaces of the fifth sheet element with each other and bonding the prescribed surfaces in the bonding sheet region.

(Aspect 15)

The cleaning tool as defined in any one of aspects 1 to 14, wherein the brush part is provided on one side of the base.

(Aspect 16)

The cleaning tool as defined in any one of aspects 1 to 14, wherein the brush part is provided on one side and the other side of the base.

(Aspect 17)

The cleaning tool as defined in any one of aspects 1 to 16, wherein the first brush region comprises fibers which are not bonded by a lateral bonded part in the transverse direction.

(Aspect 18)

The cleaning tool as defined in any one of aspects 1 to 17, wherein the second brush region comprises fibers which are not bonded by a lateral bonded part in the transverse direction.

The invention claimed is:

1. A cleaning tool, having comprising:

a cleaning sheet; and a holder configured to hold the cleaning sheet, wherein the cleaning sheet extends in a longitudinal direction which is defined by a direction of insertion of the holder into an insertion part of the cleaning sheet, and in a transverse direction crossing the longitudinal direction,
the holder has
a holding part configured to hold the cleaning sheet, and
a grip part connected to the holding part and configured to be held by a user,
the cleaning sheet has
a first sheet element,
a brush part provided on one side of the first sheet element and configured to clean an object to be cleaned, and
the insertion part into which the holding part is configured to be inserted,
the cleaning sheet has a central position in the transverse direction,
the brush part and the first sheet element are connected by a central bonded part extending in the longitudinal direction through the central position of the cleaning sheet,
a part of the brush part and the first sheet body are connected by lateral bonded parts on two sides of the central position in the transverse direction,
the brush part comprises a fiber assembly of fibers having the same length and oriented in the transverse direction,
the fiber assembly of fibers includes
a first brush region, and
a second brush region which is longer than the first brush region and has a protruding region,
the first brush region includes first fibers connected to the first sheet element by the central bonded part and not connected to the first sheet element by the lateral bonded parts,
the second brush region includes second fibers connected to the first sheet element by the central bonded part and the lateral bonded parts,
the brush part has a contact region configured to contact the object to be cleaned,
the contact region has
a first contact region in the first brush region,
a second contact region in the second brush region and between the central bonded part and one of the lateral bonded parts, and
a third contact region in the second brush region and between the one of the lateral bonded parts and an open end of the brush part,
the brush part has a higher modulus of elasticity in tension than the first sheet element, and
the brush part is connected to the first sheet element by the central bonded part and the lateral bonded parts in a tensioned state.

2. The cleaning tool as defined in claim 1, wherein
the cleaning sheet has a longitudinal center line passing in the longitudinal direction through the central position,
the first brush region has a first brush region length which is the longest distance in the transverse direction between an end of the first brush region in the transverse direction and the longitudinal center line,
the second brush region has a second brush region length which is the longest distance in the transverse direction between an end of the second brush region in the transverse direction and the longitudinal center line, and
the second brush region length is longer than the first brush region length.

3. The cleaning tool as defined in claim 1, wherein the cleaning sheet has longitudinal ends opposing to each other in the longitudinal direction, and the first brush region is provided on the longitudinal ends of the cleaning sheet.

4. The cleaning tool as defined in claim 1, wherein the cleaning sheet has longitudinal ends opposing to each other in the longitudinal direction, and the second brush region is provided on the longitudinal ends of the cleaning sheet.

5. The cleaning tool as defined in claim 1, wherein the cleaning sheet has lateral ends opposing to each other in the transverse direction, and the first brush region is provided on the lateral ends of the cleaning sheet.

6. The cleaning tool as defined in claim 1, wherein the cleaning sheet has lateral ends opposing to each other in the transverse direction, and the second brush region is provided on the lateral ends of the cleaning sheet.

7. The cleaning tool as defined in claim 1, wherein the cleaning sheet includes a plurality of the first brush regions and a plurality of the second brush regions and the first and second brush regions are alternately arranged.

8. The cleaning tool as defined in claim 1, wherein the cleaning sheet further includes a second sheet element superposed on the first sheet element, and the insertion part is formed between the first sheet element and the second sheet element.

9. The cleaning tool as defined in claim 1, wherein the first sheet element has predetermined surfaces contacted with and bonded to each other to form a bonding sheet region, the bonding sheet region defining the insertion part.

10. The cleaning tool as defined in claim 1, wherein
the cleaning sheet further includes
a third sheet element superposed on the first sheet element, and
a fourth sheet element superposed on the third sheet element, and
the insertion part is formed between the third sheet element and the fourth sheet element.

11. The cleaning tool as defined in claim 1, wherein
the cleaning sheet further includes comprising a fifth sheet element which is superposed on the first sheet element, and
the fifth sheet element has predetermined surfaces contacted with and bonded to each other to form a bonding sheet region, the bonding sheet region defining the insertion part.

12. The cleaning tool as defined in claim 1, wherein the brush part is also provided on the other side of the first sheet element.

13. The cleaning tool as defined in claim 1, wherein the protruding region of the second brush region defines an end of the cleaning sheet in the transverse direction.

14. A cleaning tool, comprising:
a cleaning sheet; and
a holder configured to hold the cleaning sheet,
wherein
the cleaning sheet extends in a longitudinal direction which is defined by a direction of insertion of the holder into an insertion part of the cleaning sheet, and in a transverse direction crossing the longitudinal direction,
the holder has
a holding part configured to hold the cleaning sheet, and
a grip part connected to the holding part and configured to be held by a user,
the cleaning sheet has
a first sheet element, and
a brush part provided on one side of the first sheet element and configured to clean an object to be cleaned, and the insertion part into which the holding part is configured to be inserted, the cleaning sheet has a central position in the transverse direction, the brush part and the first sheet element are connected by a central bonded part extending in the longitudinal direction through the central position of the cleaning sheet, a part of the brush part and the first sheet element are connected by lateral bonded parts on two sides of the central position in the transverse direction, the brush part comprises a fiber assembly of fibers oriented in the transverse direction, the fiber assembly of fibers includes a first brush region and a second brush region, the first brush region includes first fibers connected to the first sheet element by the central bonded part and not connected to the first sheet element by the lateral bonded parts, the second brush region includes second fibers connected to the first sheet element by the central bonded part and the lateral bonded parts, the brush part has a contact region configured to contact the object to be cleaned, the contact region has
- a first contact region in the first brush region,
- a second contact region in the second brush region and between the central bonded part and one of the lateral bonded parts, and
- a third contact region in the second brush region and between the one of the lateral bonded parts and an open end of the cleaning sheet, the brush part has a higher modulus of elasticity in tension than the first sheet element, and the brush part is connected to the first sheet element by the central bonded part and the lateral bonded parts in a tensioned state.

* * * * *